United States Patent
Ito et al.

(10) Patent No.: US 7,122,266 B2
(45) Date of Patent: Oct. 17, 2006

(54) HOLDING MEMBER FOR HOLDING AN ELECTROCHEMICAL CELL, A HOLDING SUBSTRATE FOR THE SAME, AN ELECTROCHEMICAL SYSTEM AND A CONNECTING MEMBER FOR ELECTROCHEMICAL CELLS

(75) Inventors: Shigenori Ito, Kasugai (JP); Takashi Ryu, Nagoya (JP); Sota Shimizu, Nagoya (JP); Kiyoshi Okumura, Kasugai (JP); Mitsuru Hattori, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 440 days.

(21) Appl. No.: 10/241,412

(22) Filed: Sep. 11, 2002

(65) Prior Publication Data

US 2003/0049513 A1 Mar. 13, 2003

(30) Foreign Application Priority Data

| Sep. 13, 2001 | (JP) | ............................ P2001-278076 |
| Oct. 23, 2001 | (JP) | ............................ P2001-324603 |
| Jun. 13, 2002 | (JP) | ............................ P2002-172368 |
| Jun. 13, 2002 | (JP) | ............................ P2002-172673 |

(51) Int. Cl.
*H01M 2/00* (2006.01)
*H01M 2/02* (2006.01)
*H01M 2/14* (2006.01)

(52) U.S. Cl. ............................ 429/34; 429/38; 429/39
(58) Field of Classification Search .................. 429/34, 429/39, 38
See application file for complete search history.

(56) References Cited

U.S. PATENT DOCUMENTS

| 5,212,023 | A | | 5/1993 | Diethelm | |
| 5,264,300 | A | * | 11/1993 | Barp et al. | ..................... 429/30 |
| 5,399,442 | A | * | 3/1995 | Shundo | ........................ 429/32 |
| 5,549,983 | A | * | 8/1996 | Yamanis | ....................... 429/32 |
| 5,902,692 | A | | 5/1999 | Batawi | |

FOREIGN PATENT DOCUMENTS

| DE | 195 17 443 A1 | 11/1996 |
| DE | 196 49 456 A1 | 6/1998 |
| EP | 0 706 229 | 4/1996 |
| EP | 0 722 193 | 7/1996 |
| WO | WO 98/57384 | 12/1998 |
| WO | 99/13522 | 3/1999 |
| WO | 99/67845 | 12/1999 |

OTHER PUBLICATIONS

D, Ghosh et al., "*Performance of Anode Supported Planar SOFC Cells*," Solid Oxide Fuel Cells (SOFC VI), Proceeding of the Sixth International Symposium, vol. 99-19, The Electrochemical Society, Inc., pp. 822-829.

* cited by examiner

*Primary Examiner*—Patrick Joseph Ryan
*Assistant Examiner*—Julian Mercado
(74) *Attorney, Agent, or Firm*—Burr & Brown

(57) ABSTRACT

The invention provides an assembly structure for facilitating assembly of laminated cells, for reducing the possibility of gas leakage and for preventing the reduction of generating efficiency of cells due to gas leakage. In a disclosed embodiment, a plate-shaped electrochemical cell 9 made of a ceramic material with a through hole 9a formed therein is held by a holding member 1. The member 1 is made of a ceramic material and has a plate-shaped main body 1a of a shape of a flat plate and a protruded portion 1b. A first supply hole 2A for supplying one gas and a second supply hole 2B for supplying the other gas are formed in the holding member 1. The main body 1a has a sealing surface 1c against the one main face 9a of the cell 9 while the protruded portion 1b is inserted into the through hole 9a.

24 Claims, 22 Drawing Sheets (a)

HOLDING MEMBER FOR HOLDING AN ELECTROCHEMICAL CELL, A HOLDING SUBSTRATE FOR THE SAME, AN ELECTROCHEMICAL SYSTEM AND A CONNECTING MEMBER FOR ELECTROCHEMICAL CELLS

This application claims the benefits of Japanese Patent Applications P2001-324603 filed on Oct. 23, 2001, P2001-278076 filed on Sep. 13, 2001, P2002-172368 filed on Jun. 13, 2002, and P2002-172673 filed on Jun. 13, 2002, the entireties of which are incorporated by reference.

BACKGROUND OF THE INVENTION

1. Field of the Invention

The present invention relates to a holding member for an electrochemical cell, a holding structure of the same and an electrochemical system. The present invention further relates to an electrochemical cell and an electrically conducting member used for connecting it.

2. Related Art Statement

Solid oxide fuel cells are generally divided into two categories; a planar type and a tubular type. In planar type solid oxide fuel cells, a power generating stack is formed by alternately laying so-called separators and power generating layers, (cell). An appropriate structure is needed for separating a fuel gas and oxidizing gas when a plurality of planar single cells are stacked to produce a generator. It is also necessary to reduce the thermal stress between the single cells, manifold for gas supply and separators (interconnectors).

In Japanese Patent Laid-open No. P1993-54897A, an anode and a cathode are respectively formed on each side of an electrolyte to prepare a power generation layer (cell). Then, a thin film containing ceramic powder and an organic binder is sandwiched between this cell and the separator, and the assembly is heat-treated so that the cell and the separator are joined with each other.

Japanese Patent publication P1994-290798A disclosed another type of a solid oxide fuel cell. In the disclosure, a plurality of ring-shaped single cells are stacked to produce a generator. Each of the cells is held with a metal separator. The separator has a disk-shaped gas manifold and a flange portion surrounding the gas manifold. The gas manifold has formed therein two through holes for an oxidizing gas and a fuel gas. The flange portion has formed therein grooves for the oxidizing and fuel gases. The flange portion is intervened between the adjacent single cells vertically arranged. An oxidizing gas is supplied into a mesh through hole in the gas manifold. The supplied gas then flows in the groove in the flange portion and contacts with the cathode electrode of the single cell. A fuel gas is supplied into the other through hole of the gas manifold. The supplied fuel gas then flows in the groove of the flange portion and contacts with the anode electrode of the single cell, so that the gases may contribute to power generation. An insulating plate is interposed between the adjacent separators to prevent the short-circuit between the separators.

Further, in a prior planar type solid oxide fuel cell, a gas sealing portion is positioned in the outer boundary of the cell. For example, FIG. 12 of Japanese Patent publication 1994-290798A shows a perspective view of one of such planar type cell. According to this disclosure, the cell is composed of a plate of a solid electrolyte material, a fuel electrode and an air electrode, each being made of a ceramic material. The cell and separator that are made of ceramic materials are alternately stacked to produce a generator. In the stack, a groove for supplying an oxidizing and a fuel gas are formed crossly.

To produce a generator by stacking separators and single cells alternately, it is necessary to supply a gas between the separator and the cell so that fuel and oxidizing agent may be supplied to the electrodes of the single cell. At the same time, the single cell and the separator must be electrically connected in series by intervening an electrically conductive connecting member between the separator and single cell. When such connecting member is located in, for example, a fuel gas passage, it must be chemically stable in a reductive fuel gas environment at an operating temperature of the single cell. Further, there must be a gap through which the fuel gas is passed. For such reasons, so-called nickel felt has been commonly used as the connecting member in the fuel gas passage.

On page 824 of "Electrochemical Society Proceedings Volume 99-19" is shown a stacked layer of a separator and a planar single cell. A number of elongated passages regularly arranged are formed on the separator and the grooves are used as fuel gas supply passages. A power generation device is formed by sandwiching a mesh between a surface on the separator groove side and an anode electrode film of the single cell and pressing the mesh.

On pages 8 to 9 and FIG. 1 of Japanese Patent Publication No. 503381/2002, a separator and a cell are connected to each other by sandwiching a corrugated sheet between the separator and cell and then by pressing it. The corrugated sheet electrically connects the separator and the cell. Further, the publication describes that the corrugated sheet is preferably made of an expanded metal.

SUMMARY OF THE INVENTION

In the solid oxide fuel cell disclosed in Japanese Patent publication 1994-290798A, however, the single cell is made of a ceramic material and the separator is made of a metal, so that the difference of thermal expansion between the cell and separator is large. Cracks may be therefore formed in the cell along the interface of the cell and separator due to the difference of thermal expansion after repeated thermal cycles of temperature elevation and reduction. Gas leakage may be likely to increase as a result.

Further, in a prior planar type solid oxide fuel cell, gas sealing is assured in the outer boundary of the planar type fuel cell structure. It is thus difficult to reduce the thermal stress generated in the central portion of the cell, so that the cell might be susceptible to crack formation.

Further, when nickel felt is used as an electrically conductive connecting member, a fuel gas may be supplied into small gaps within the nickel felt and remain in it, and then it may be discharged outside of a container before contributing to power generation. When hydrogen is used as the fuel gas, the power generation causes water production on an anode electrode side. However, the produced water may be advanced into small gaps within the nickel felt and remain therein. In this case, the partial pressure of oxygen in fuel gas is increased as a result of the chemical equilibrium of water-oxygen-hydrogen system in the fuel gas, resulting in a decrease of the open circuit voltage. Further, mechanical pressing on the cell is needed to reduce the contact resistance and thus to improve the electrical connection. In this case, the electrochemical cell might be susceptible to crack formation.

An object of the invention is to provide a novel electrochemical system having planar single cells stacked with each other, and to facilitate the stacking of the single cells and separator.

Another object of the invention is to reduce the possibility of gas leakage after repeated cycles of temperature elevation and reduction and to prevent the reduction of generating efficiency of the cells due to the gas leakage.

When a mesh is used as an electrically conductive connecting member, a fuel gas flows within grooves of the separator and is supplied onto an electrode surface. In this case, since metallic wire of the mesh contacts and covers the electrode surface, the fuel gas cannot be supplied onto the electrode surface at parts covered with the metallic wire and is lost. Further, although the fuel gas can be supplied within grooves on the separator, the fuel gas is not penetrated to a part of a protrusion in the separator as will be described later. This is because, a mesh is sandwiched and pressed between a surface of the protrusion and the electrode surface, the mesh (metallic wire forming the mesh) works as an obstacle for the supplying fuel gas. The penetration of a fuel gas into gaps (interstices) between the protrusion surface and electrode surface is thus prevented. As a result, a substantial area in the electrode surface of a single cell does not contribute to power generation. Further, when a mesh is sandwiched between the protrusion surface and the electrode surface and pressed, the deformation of the mesh in the thickness direction is relatively small. In this case, one side or uneven pressing on an electrochemical cell is likely to occur due to a slight distortion in the cell, thereby the cell might be susceptible to crack formation.

Further, when a corrugated metallic sheet, for example an expanded metal, is used as an electrically conductive connecting member, the stacking and pressing of the electrically conductive connecting member and the separator causes the following problems. That is, when a plurality of corrugated sheets and separators are alternately stacked to form a generator, this stack is pressurized toward the stacking direction by a given pressing mechanism. By this pressing, the corrugated sheet is compression-deformed in such a manner that the thickness of the corrugated sheet is reduced. In this case, if the pressing direction is perfectly controlled to the stacking direction, there is no problem. Nevertheless, in practice, a correct control of the pressing direction is difficult.

For example, as shown in FIG. 1(a), a corrugated sheet 82 is sandwiched between an electrochemical cell 81 and a separator 80 and is pressed. In this case, it is common that the centers of gravity of respective loads in both ends (upper and lower ends) of the stack are slightly shifted. Namely, in this case, a load is applied toward slanted directions S and T with respect to the stacking direction A on a corrugated sheet, as shown by an arrow R. As a result, a pressure perpendicular to the stacking direction A is applied onto the corrugated sheet 82. When a pressure in a direction of an arrow T is applied as shown in FIG. 1 (b), the deformation of the corrugated sheet 82 is small. However, if a component of the direction of an arrow S is present in a pressure on the sheet, the entire corrugated sheet 82 is deformed in such a manner that it is crushed toward the corrugation advancing direction (direction of an arrow S). As a result, the separator 80 and the electrochemical cell 81 are shifted in the direction of arrow S so that the assembled cells may be broken.

An object of the present invention is to provide a novel electrochemical system with an electrochemical cell and an electrically conductive connecting member contacting the cell, and to prevent the residence of a gas within the connecting member.

Another object of the present invention is to reduce a region on an electrode surface of the electrochemical cell which is not in contact with a gas.

Still another object of the present invention is to reduce the contact resistance of the connecting member, so that soft contact of the connecting member and the cell may be realized and the breakage of the cell may be prevented.

(Disclosure of a First Aspect of the Invention)

A first aspect of the present invention provides a holding member having one and the other main faces for holding a planar electrochemical cell, The cell is made of a ceramic material with a through hole formed therein. The holding member is made of a ceramic material and comprises a planar main body and a protruded portion protruding from the main body. The protruded portion is to be inserted into the through hole of the cell. A first supply hole for supplying one gas and a second supply hole for supplying the other gas are formed in the holding member, and the main body has a sealing surface against the one main face of the cell while the protruded portion is inserted into the through hole.

The first aspect of the present invention further provides an electrochemical system comprising a plurality of electrochemical cells. The system comprises an electrochemical cell, the holding member described above and a separator electrically connecting the cells adjacent with each other. Each of cells is held by the holding member, and the separators and cells are positioned alternately.

According to the first aspect of the present invention, each electrochemical cell is held by a holding member made of a ceramic material. At the same time, a protruding portion to be inserted into the through hole of the cell is provided in the holding member. The holding member thus has a protruding portion for holding the cell and a main body having a sealing surface against the one main face of the cell.

According to the supporting structure, both of the main body and electrochemical cell are made of ceramics. Such holding structure has a smaller difference in thermal expansion as compared with a case of metallic holding member. Therefore, this holding structure is unlikely to have a bad influence based on the stress due to the difference in thermal expansion between the cell and holding member. Gas leakage from the sealing portion along the cell and holding member may thus be prevented over a long time period. Further, the sealing portion of the separator is located on the holding member provided in the central portion of the cell and the cell is not fixed in its outer peripheral portion. The thermal stress generated in the cell may escape toward the outer peripheral portion of the cell, so that crack formation inside of the cell may be prevented.

(Disclosure of a Second Aspect of the Invention)

A second aspect of the present invention provides an electrochemical system comprising an electrochemical cell and a connecting member having an electrical conductivity (referred to as "connecting member" below). The cell has a solid electrolyte film having one and the other surfaces, one electrode provided on the one surface of the film and to be brought into contact with one gas, and the other electrode provided on the other surface of said film and to be brought into contact with the other gas. The connecting member which has an emboss-shape is contacted with the cell.

The second aspect of the present invention further provides an electrically conductive connecting member to be contacted with an electrochemical cell. The cell comprises a solid electrolyte film having one and the other surfaces, one electrode provided on the one surface of the film and being to be brought into contact with one gas, and the other electrode provided on the other surface of the film and being to be brought into contact with the other gas. The connecting member has a permeable member including an emboss shape provided portion.

According to the second aspect of the present invention, an electrically conductive connecting member consisting of a permeable material is used, so that gas is prevented from being retained within the connecting member. Further, by providing an emboss-shape portion protruded from the permeable material, a region which does not contact with a gas in the electrode surface of the cell may be reduced. Additionally, by the deformation of the emboss-shape portion, a pressing load onto the cell surface may be equalized. A relatively small deformation of the cell may be thereby allowed so that the uneven contact of the connecting member onto the electrode surface may be prevented.

These and other objects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

FIG. 3 (*b*) is a plan view of the holding member 1 when viewed from the main surface 6 side thereof.

FIG. 6 shows assembled cells obtained by alternately laminating the respective plural holding structures 20 and the separators 15.

FIG. 18 (*b*) is a cross-sectional view taken along a line XVIIIb—XVIIIb of the separator 65A.

FIG. 19 (*b*) is a cross-sectional view taken along a line XVIVb—XVIVb of the separator 65B.

FIG. 20 (*b*) is a cross-sectional view taken along a line XXb—XXb of the separator 65C.

FIG. 21 (*b*) is a cross-sectional view taken along a line XXIb—XXIb of the separator 65D.

PREFERRED EMBODIMENTS OF THE INVENTION (Detailed Description of the First Aspect of the Present Invention)

The first aspect of the present invention, especially the advantages, effects and preferred embodiments, will be described below, referring to the attached drawings.

Figure 1:
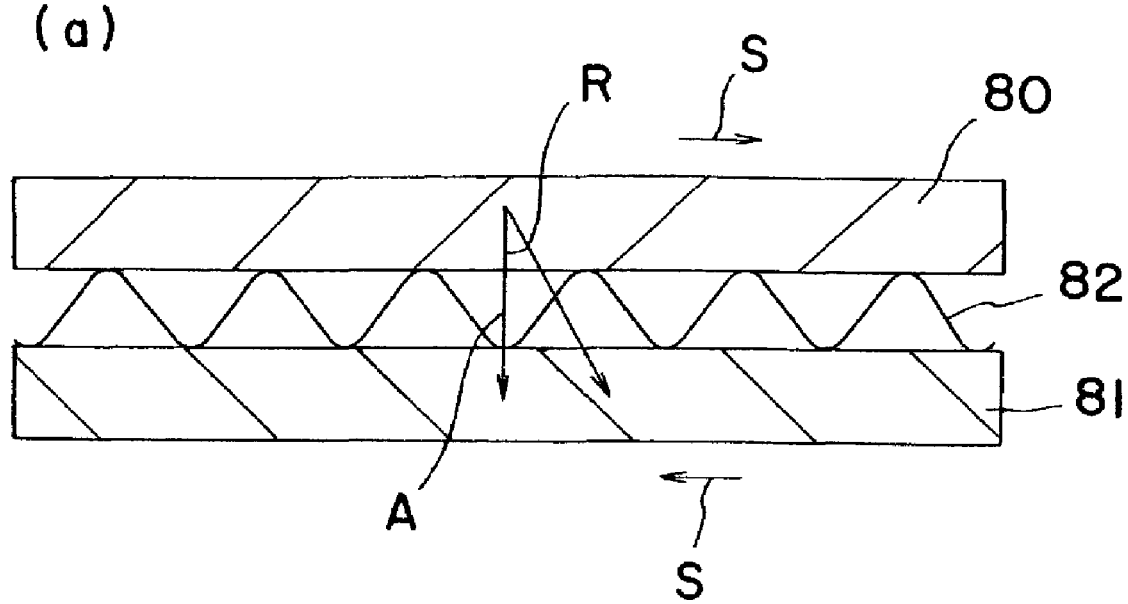
FIGS. 1 (*a*) and 1 (*b*) are views explaining the problems with a conductive connecting member consisting of a corrugated sheet.
Figure 1:
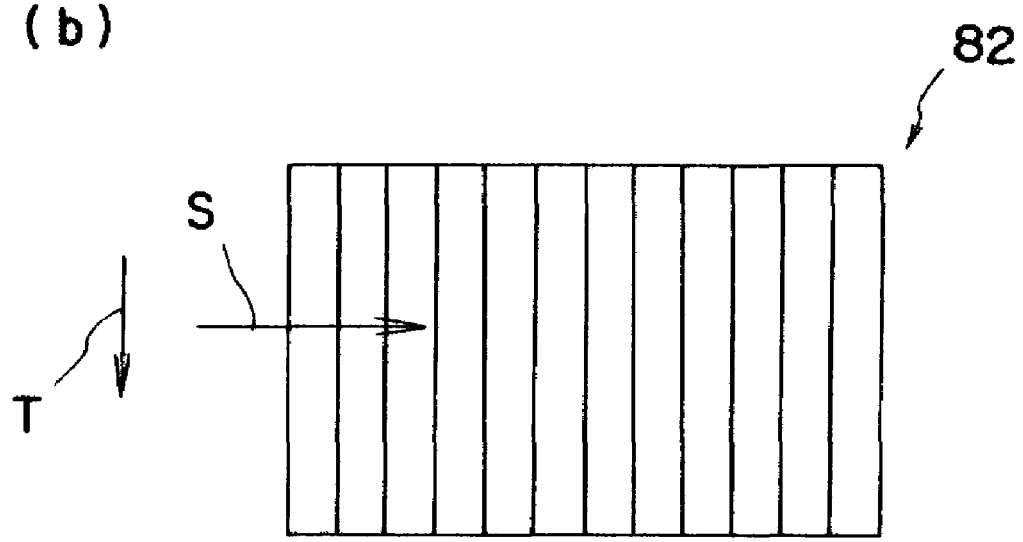
Figure 2:
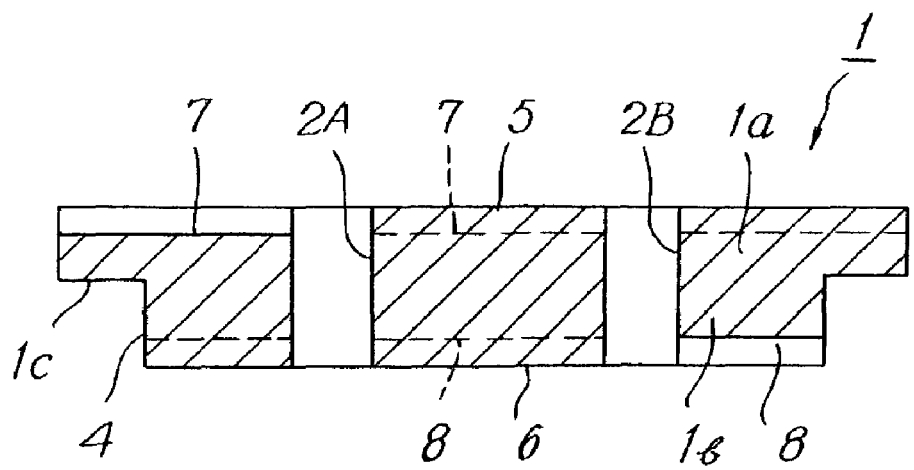
FIG. 2 is a cross-sectional view of a holding member 1 according to an embodiment of the invention.
Figure 3:
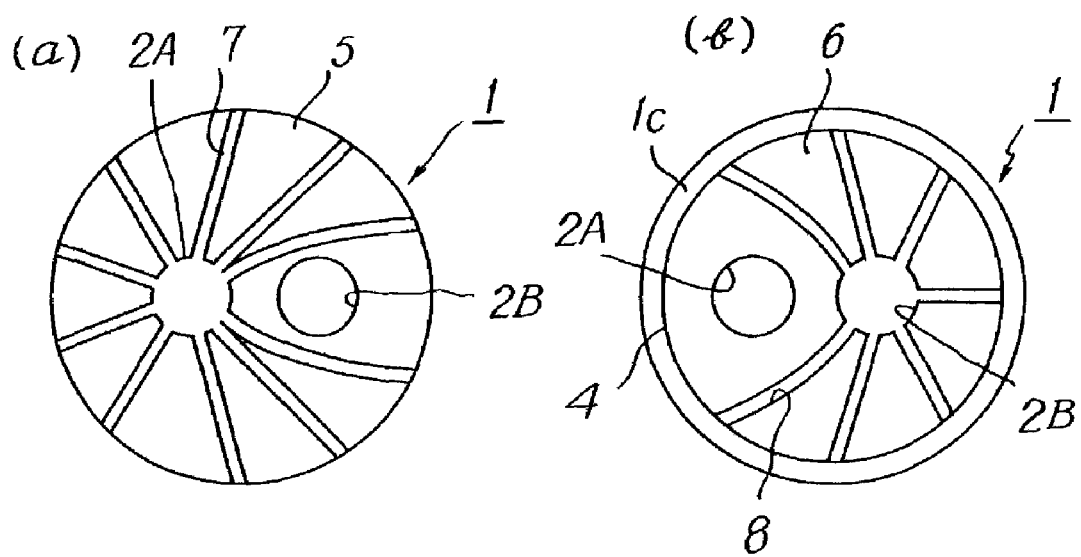
FIG. 3 (*a*) is a plan view of the holding member 1 when viewed from the main surface 5 side thereof.

FIG. 2 is a cross-sectional view schematically showing a holding member 1 according to one embodiment of the first aspect of the invention. FIG. 3 (*a*) is a plan view of the holding member 1 when viewed from the main surface 5 side, and FIG. 3 (*b*) is a plan view of the holding member 1 when viewed from the main surface 6 side.

Although the planar shape of the holding member 1 is substantially round as shown, for example, in FIG. 3, the shape is not limited to the round shape, but an oval shape, or a polygonal shape may be used. For minimizing the thermal stress in the single cell, the holding member 1 is preferably substantially round. The holding member 1 has a main body 1*a* having a comparatively larger diameter and a protruded portion 1*b* having a comparatively smaller diameter. Further, a pair of through holes 2A and 2B are formed between the main surfaces 5 and 6 so that they penetrate the main body 1*a* and protruded portion 1*b*. The through hole 2A is a supply hole for one gas and the through hole 2B is a supply hole for the other gas. The reference numerals 5 and 6 each denote a sealing surface against the adjacent separators as will be described later, and each sealing face is flat in the present example. The reference numerals 1*c* and 4 each denotes a sealing surface against an electrochemical cell, as described later.

One gas passage 7 is formed on the main surface 5 side of the main body 1*a*, and the other gas passage 8 is formed on the main surface 6 side of the protruded portion 1*b*. The passage 7 is composed of a groove formed on the side of the main surface 5, as shown in FIG. 3 (*a*) and communicates with one supply hole 2A. The flow passage 8 is composed of a groove formed on the side of the main surface 6, as shown in FIG. 3 (*b*) and communicates with the other supply hole 2B.

Figure 4:
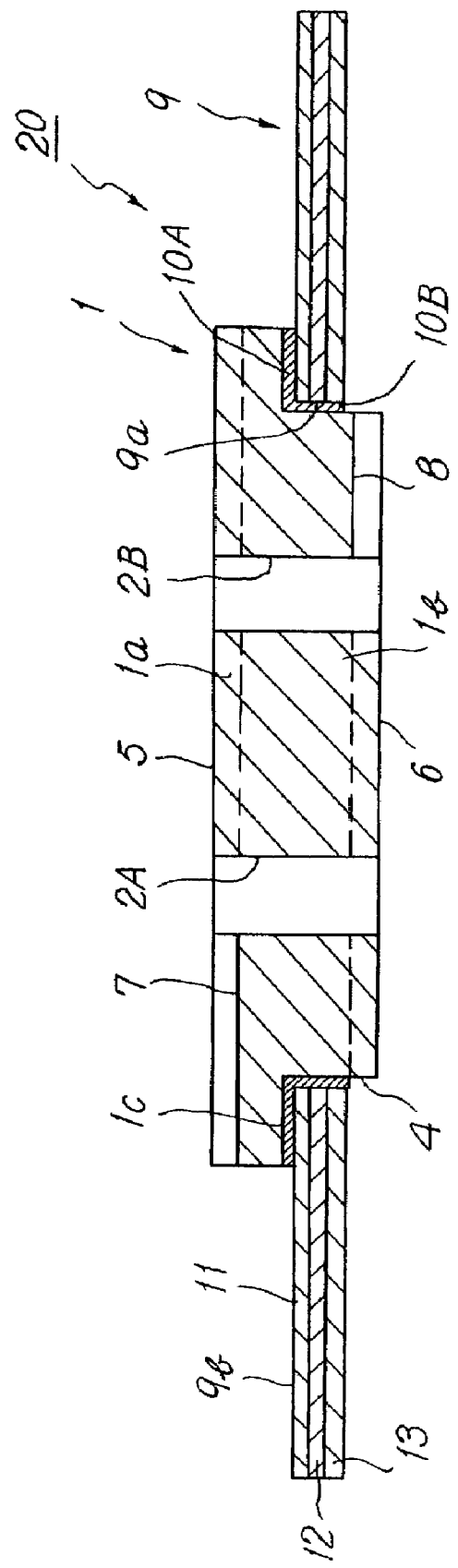
FIG. 4 is a cross-sectional view showing a holding structure 20 obtained by holding an electrochemical cell 9 by the holding member 1.

FIG. 4 is a holding structure 20 comprising an electrochemical cell 9 and a holding member 1 holding the cell. The cell 9 is formed of a three-layered structure comprising, for example, one electrode 11, a solid electrolyte layer 12 and the other electrode 13. A protruded portion 1*b* is inserted through a through hole 9*a* of the cell 9. A sealing member 10B is intervened between the outer peripheral surface 4 of the protruded portion 1*b* and the cell 9. Further, a sealing member 10A is intervened between the one main surface 9*b* of the cell 9 and the sealing face 1*c* of a flange portion of the main body 1*a*.

Figure 5:
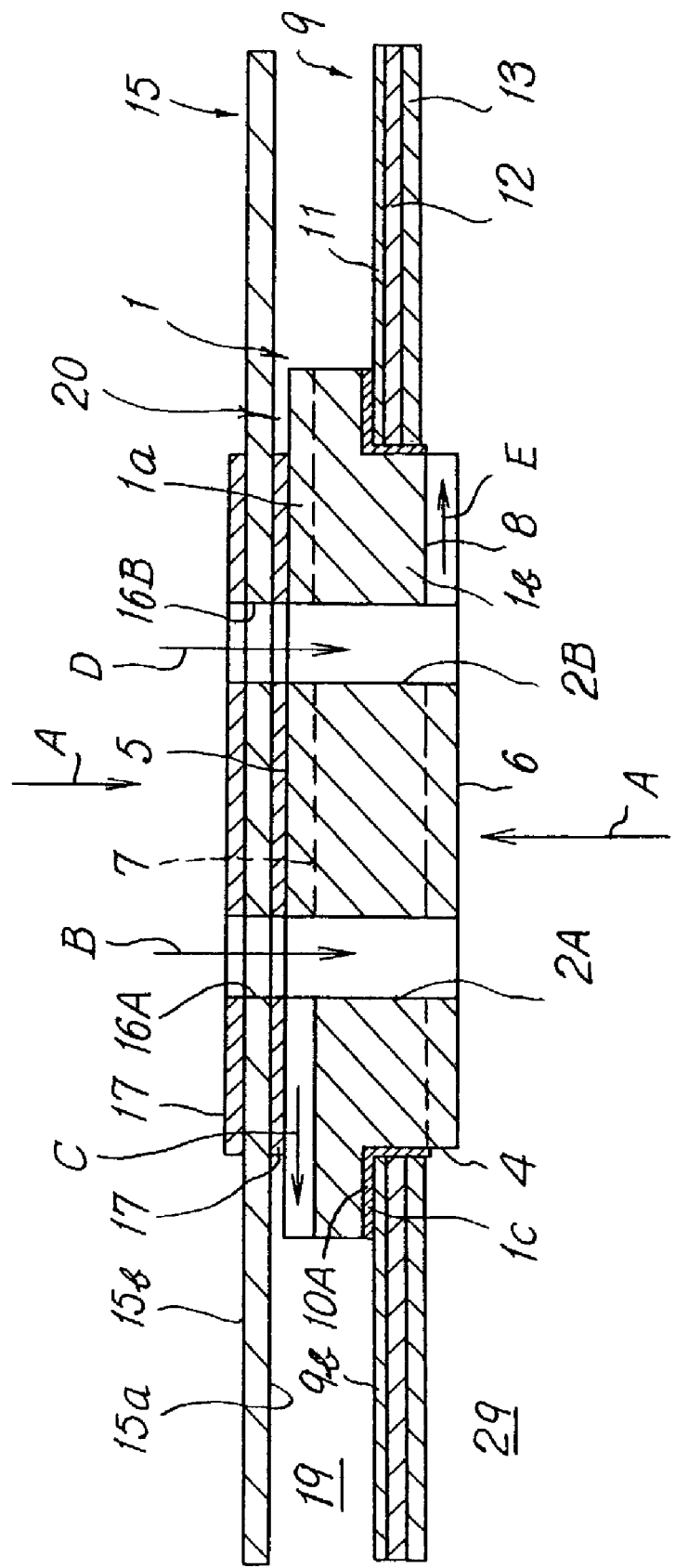
FIG. 5 is a cross-sectional view showing a state where a holding structure 20 and a separator 15 of FIG. 4 are laminated.
Figure 6:
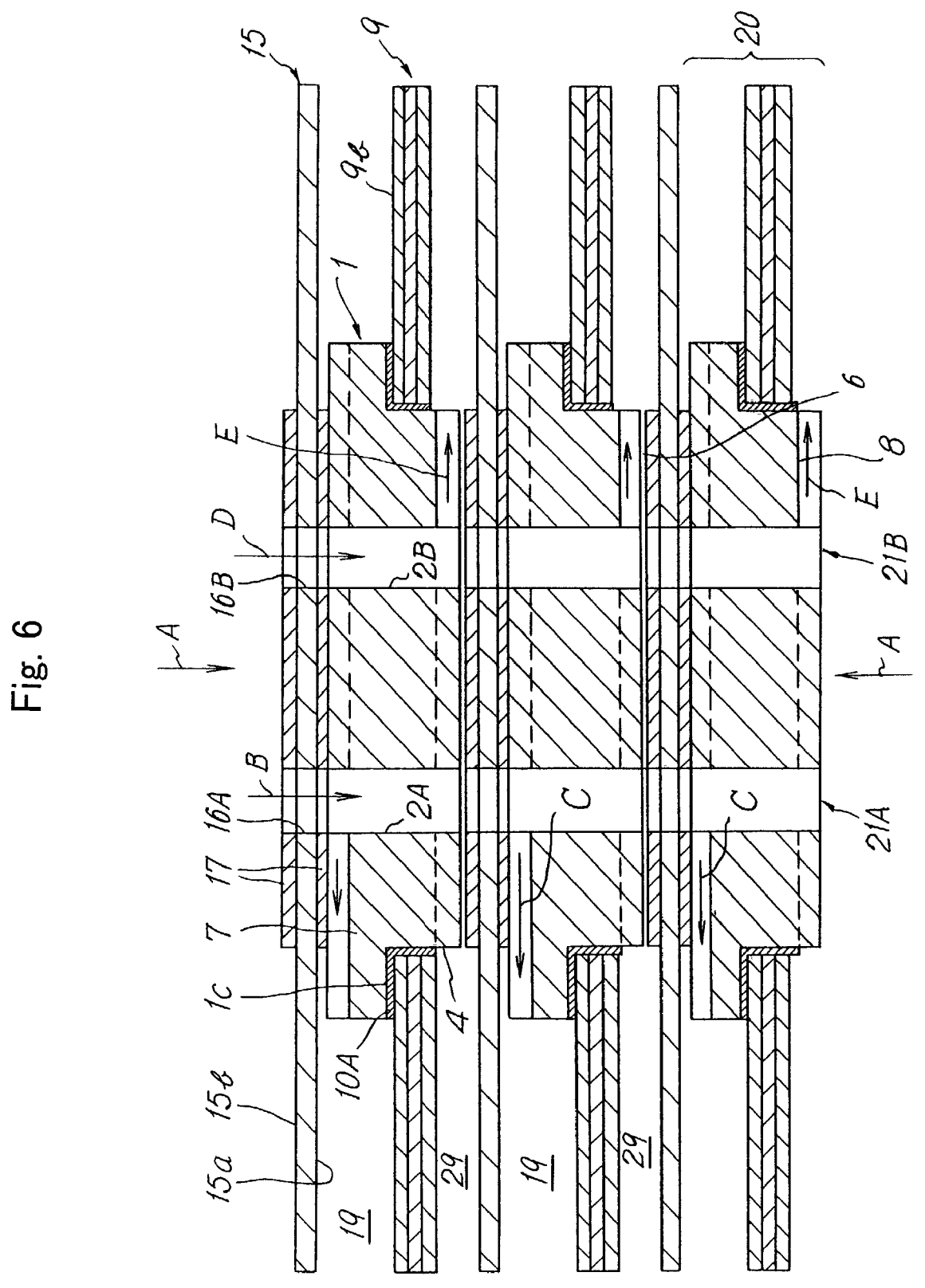

FIG. 5 is a cross-sectional view showing a planar separator 15 stacked on the holding structure 20 in FIG. 4. Further, FIG. 6 is a schematic cross-sectional view showing an electrochemical system obtained by stacking the holding structures 20 and the separators 15 shown in FIG. 5. In FIG. 5, only three layers of electrochemical cells and separators are drawn because of the limitation of the drawing sheet, but the numbers of the cells and separators can be optionally changed.

In this example, the separator 15 is flat plate-shaped and is made of an electrically conductive material such as a metal or the like. In the separator 15, a pair of through holes 16A and 16B are formed at positions corresponding to the through holes 2A and 2B of the holding member, respectively. The main surface 15*a* of the separator 15 is pressed on the sealing face 5 of the holding member 1 in a direction of an arrow A through a sealing member 17 and thus sealed. On the other hand, the main surface 15*b* of the separator 15 is pressed on the flat sealing face 6 of the holding member 1 in a direction of an arrow A through the sealing member 17 and thus sealed.

A plurality of gas supply holes 2A and 16A communicate with each other, so that a gas supply hole 21A over the entire electrochemical system is formed. Similarly, a plurality of gas supply holes 2B and 16B communicate with each other, so that a gas supply hole 21B over the entire electrochemical system is formed. One gas is supplied to the gas supply hole 21A as an arrow B, then flows through the gas passage 7 in substantially parallel with the main surface 9*b* as an arrow C and finally flows into a space 19 to contribute to an electrochemical reaction. The other gas is supplied to the gas supply hole 21B as an arrow D, then flows through the gas passage 8 in substantially parallel with the main surface 9*b* as an arrow E and finally flows into a space 29 to contribute to an electrochemical reaction. Connecting members for connecting the separators 15 and cells 9 are inserted into the spaces 19 and 29, although the members were not shown in the above figures.

According to the holding structure of the first aspect of the invention, each electrochemical cell 9 is held by the ceramic holding member 1, and the holding member 1 is provided with a protruded portion 1*b* to be inserted through the through hole 9*a* of the cell 9. The cell 9 is thus held around the protruded portion 1*b* while a sealing face 1*c* being flat and parallel with respect to the main surface of the cell is provided on the main body 1*a*.

According to the supporting structure, both of the holding member 1 and the cell 9 are made of ceramic materials, so as to prevent the adverse effects of the stress due to the difference in thermal expansion between the cell and holding member on the sealing portion. Gas leakage from the sealing portion along the cell and holding member may thus be prevented over a long time period.

In a preferred embodiment, as shown in FIGS. 2 to 6, the main body 1*a* of the holding member includes one gas passage 7 communicating with one supply hole 2A and a space 19 over the cell 9. This gas passage 7 may preferably be formed by a groove or a concave region recessed from the main surface 5 as in the above example. Alternatively, the passage 7 may be a hollow region inside the main body 1*a*.

In a preferred embodiment, as in the above example, the protruded portion 1*b* of the holding member includes the other gas passage 8 communicating with the other supply hole 2B and a space 29 over the cell 9. By providing the one gas passage on the main surface 5 of the holding member 1 and providing the other gas passage on the other main surface 6 of the holding member, both gases may be efficiently separated from each other. This gas passage 8 may preferably be formed by a groove or a concave region recessed from the main surface 6 as in the above example. Alternatively, the passage 8 may be a hollow region inside the protruded portion 1*b*.

In a preferred embodiment, as in the above example, the gas passages 7 and 8 extend substantially parallel with the one main surface 9*a* of the cell 9. Accordingly, the thickness of the holding member 1 may be minimized. It is not required that the passage be extended in a direction parallel with the main surface 9*a* in a geometrically strict meaning, and an allowance and error caused during the assembling or during the production of the system may be allowed.

In a preferred embodiment, as in the above example, the holding member 1 includes additional flat sealing faces 5 and 6 to be pressed against the separator 15. Most preferably, the main body 1*a* includes an additional flat sealing face 5 to be pressed against the separator 15, and/or, the protruded portion 1*b* includes an additional flat sealing face 6 to be pressed against the separator 15. By utilizing such sealing faces for the press-sealing, a sealing portion may be formed which is effective for preventing gas leakage due to repeated heat cycles.

Especially, it is preferable that the sealing faces 5 and 6 are substantially perpendicular to the pressing direction A. In this case, it is not necessary for the sealing surfaces 5 and 6 to be extended in a direction perpendicular to the pressing direction in a geometrically strict meaning, with an allowance and error caused during the assembling or during the production of the system being allowed.

In a preferred embodiment, one recess for receiving one sealing member and the other recess for receiving the other sealing member are provided in the separator. The recess may be effective for preventing the shift of each separator in a lateral direction during pressing.

Further, the gas passage may be provided in the separator. That is, the main surfaces 5 and 6 of the holding member are made flat and on the other hand, the gas passage may be provided in the separator as shown in FIGS. 2 (*a*) and 2 (*b*).

Further, in more detailed description, the inventors have found that when gas passages are provided in the ceramic holding member, failure such as cracks possibly occurs in the holding member during the heating and pressing. The reason may be considered as follows. For example, referring to FIG. 5, the gas passages 7 and 8 are opened to the sealing surfaces 5 and 6 of the holding member. As a result, it is considered that the strength of the holding member has the tendency to be decreased around the sealing surfaces. Further, since the holding member has a function to hold the electrochemical cell, a spatial allowance is small in designing the gas passage in the member. It is thus difficult to design the gas passage in the holding member so as to prevent the reduction in strength of the holding member around the sealing surface.

It is thus preferred to shift at least a part of the function of gas supply passage to the separator by providing a gas supply passage in the separator, for ensuring the mechanical strength of the ceramic holding member under heating and pressing.

Thus, in a preferred embodiment, the separator is provided with one supply passage communicating with one gas supply hole of the holding member and a space over the electrochemical cell. In this case, since a part of the function of gas supply is transferred to the separator, the one gas passage in the holding member may be reduced or may be omitted. Accordingly, the mechanical stability near the sealing surface of the holding member may be improved. Most preferably, the holding member is not provided with the one gas passage.

In a preferred embodiment, the separator is provided with the other supply passage communicating with the other gas supply hole and a space over the electrochemical cell. In this case, the other gas passage in the holding member may be also reduced or omitted. Most preferably, the holding member is not provided with the other gas passage.

The material for a separator is not particularly limited, as far as the material is resistive against a gas used at an operating temperature. The separator may preferably be, for example, a complex oxide of perovskite type containing lanthanum and more preferably may be lanthanum chromite.

The separator may preferably be made of a metal such as stainless steel, a nickel-based alloy, a cobalt-based alloy or an iron-based alloy. In this case, gas supply passages having various shapes may be formed in the separator. Further, the separator is unlikely to break under heating and pressing.

Figure 7:
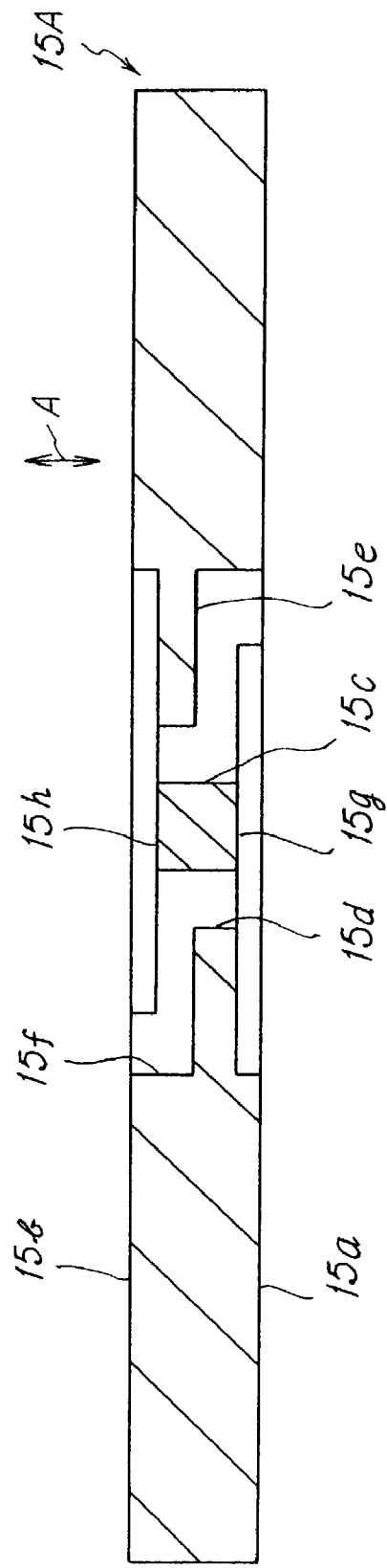
FIG. 7 is a cross-sectional view showing a separator 15A according to another embodiment.
Figure 8:
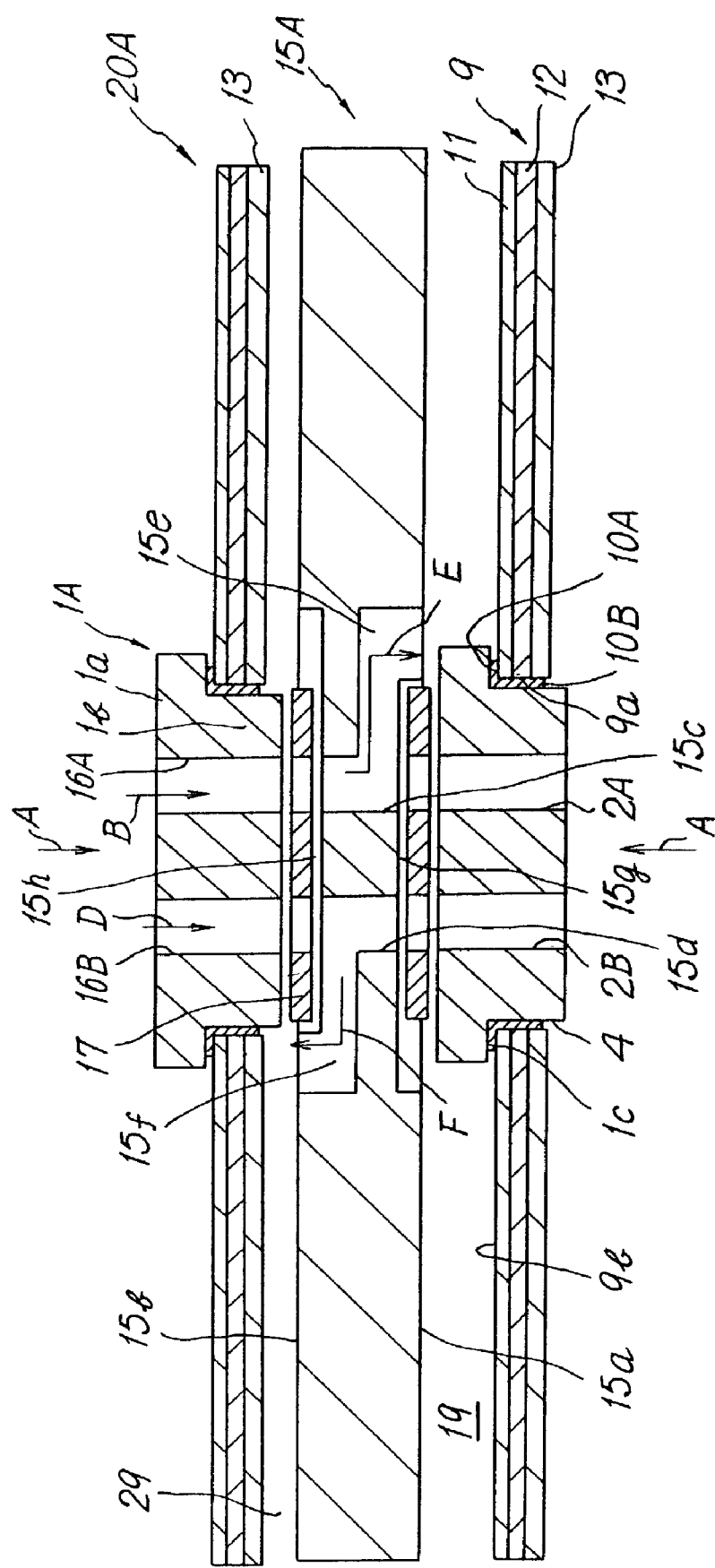
FIG. 8 shows an alternately laminated structure of the separators 15A and the holding structures 20A.
Figure 9:
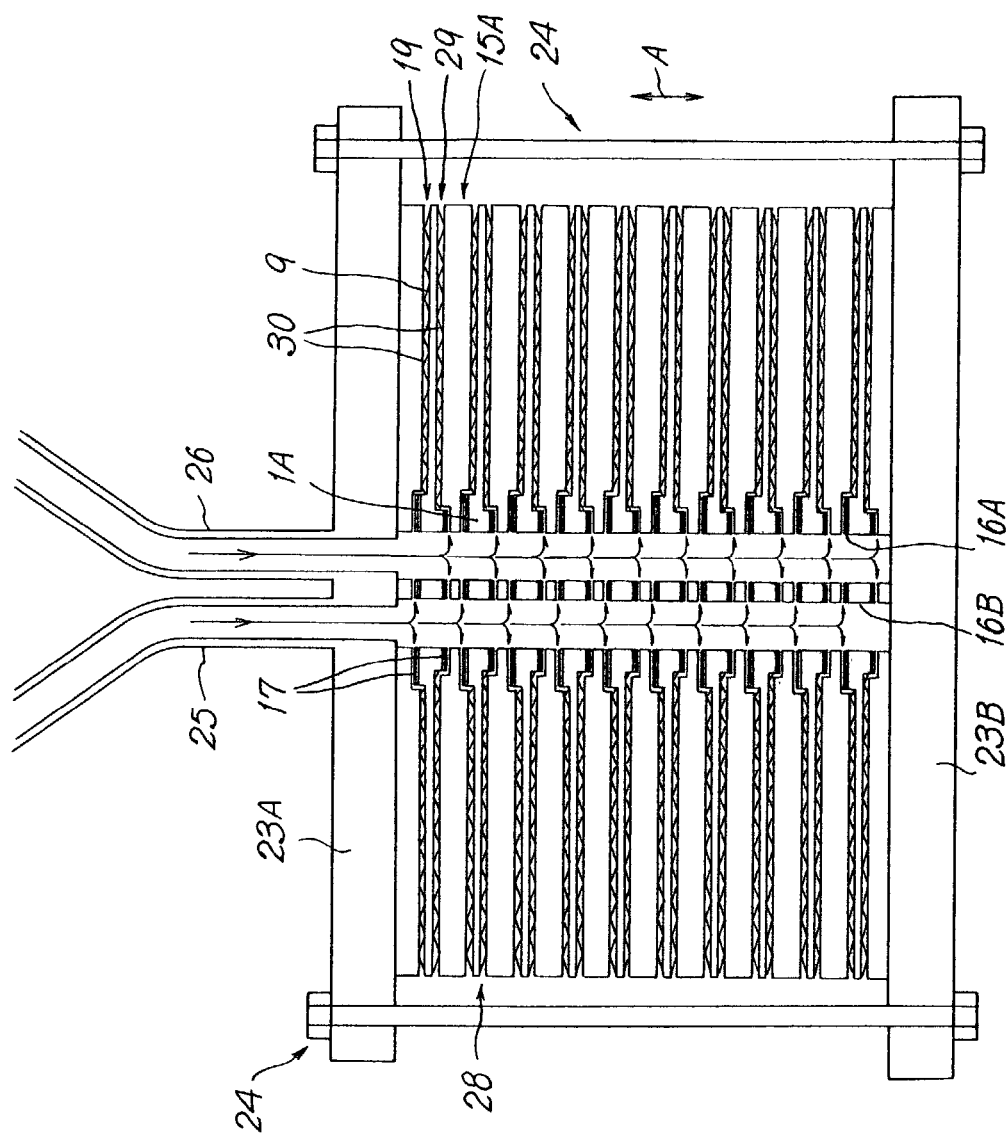
FIG. 9 is a schematic view showing a pressing mechanism of assembled cells consisting of the separator 15A, the electrochemical cell 9 and the holding member 1A.

FIGS. 7 to 9 show an electrochemical system according to such an embodiment. FIG. 7 is a cross-sectional view showing a separator 15A. The separator 15A is substantially flat plate-shaped as a whole. The separator 15A is provided with gas supply holes 15*c* and 15*d* communicating with the corresponding supply holes of the holding member, and is also provided with gas supply passages 15*e* and 15*f*. Each of the gas supply passages 15*e* and 15*f* has a portion which extends substantially parallel with the direction of an arrow A and a portion which extends substantially vertical thereto, so that each passage is bent. Further, the separator 15A is provided with recesses 15*h* and 15*g* for receiving the respective sealing members.

In a preferred embodiment, the gas supply passage formed in the separator may be bent and/or curved. Such a design is effective for diffusing the gas radially at the outer periphery of the holding member just before entering the power generating room, and for supplying the gas uniformly onto the whole surface of the cell.

As shown in FIG. 8, the holding structure 20A, the separator 15A and sealing member 17 are laid alternately to prepare a stack. In the present example, the holding member 1A does not include such a gas supply passage communicating with the space 19 or 29. The respective sealing members 17 are received in the recesses 15*g* and 15*h* and thus fixed. One gas flows in a gas supply hole 16A as an arrow B, and then flows in the gas supply passage 15*e* in the separator 15A while being bent as an arrow E, and then is supplied into the space 19. The other gas flows in a gas supply hole 16B as an arrow D, and then flows in the gas supply passage 15*f* in the separator 15A while being bent as an arrow F, and then is supplied into the space 29. When the gas flows in bent supply passages 15*e* and 15*f*, the gas is diffused radially at the outer periphery of the holding member just after being supplied into the space 19 and 29. The diffused gas may thus be supplied into the spaces 19 and 29 uniformly. Accordingly, the efficiency of gas usage is enhanced. The gas supply passage may be bent two or more times. The separator surfaces 15*a* and 15*b* directly facing the spaces 19 and 29, respectively, may be provided with a gas flow passage with an uneven shape. As a result, the flow of supplied gas is controlled by the passage, so that the gas may be uniformly supplied into the entirety of the spaces.

In a preferred embodiment, an assembled generator is produced by a plurality of separators, electrochemical cells and holding members, and a holding structure for holding the assembled cell while pressing them is provided. This pressing mechanism is not particularly limited. For example, this pressing mechanism may be a fastening member such as a bolt or the like, or a pressing mechanism such as a spring or the like.

FIG. 9 is a schematic view showing an assembled generator according to the present embodiment. An assembled generator (stack) 28 is formed by stacking and assembling the above-mentioned separators 15A, the holding members 1A, the electrochemical cells 9 and connecting members. Pressing plates 23A and 23B are located at the upper and lower ends of this assembled generator 28, respectively, and they sandwich the generator 28. The pressing plates 23A and 23B are fastened by a fastening mechanism 24 and pressed by a bolt (a fastening mechanism), in a direction of an arrow A. To the gas supply holes 16A and 16B are connected exterior gas pipes 26 and 25, respectively, so that gas can be supplied. The connection of this gas pipe to the gas supply hole is not limited. For example, the gas pipes may be connected to both of the upper and lower ends of the stack, respectively, so that one gas flows from the upper to the lower ends and the other gas flows from the lower to upper ends. Such design may be effective for supplying gas uniformly to the generator (stack).

As described above, according to the first aspect of the present invention, it is possible to facilitate the assembly and stacking of single cells, to reduce the possibility of gas leakage after repeated cycles of temperature elevation and reduction, and to prevent the reduction of generating efficiency of cells due to the gas leakage.

(Application of the Above Descriptions of the First Aspect to an Electrochemical System According to the Second Aspect)

All the descriptions of the first aspect described above referring to FIGS. 1 to 9 may be applied to an electrochemical system of the second aspect described later.

(Detailed Description of the Second Aspect of the Present Invention)

A second aspect of the present invention provides an electrochemical system comprising a connecting member having electrical conductivity contacting an electrochemical cell. The connecting member has a permeable member including an emboss shape provided portion. The connecting member may preferably be plate-shaped.

According to the second aspect of the present invention, a conductive connecting member consisting of a permeable material is used, so that gas may be efficiently supplied into the spaces 19 and 29. Further, by providing an emboss shape provided portion protruded from the permeable material, a region which does not contact with a gas in the electrode surface of the cell may be reduced. Additionally, by the deformation of the emboss shape provided portion, a pressing load onto the cell surface may be equalized. A relatively small deformation of the cell may be thereby allowed while preventing the uneven contact of the connecting member onto the electrode surface. Moreover, when a stack is assembled, an electrochemical cell 9 may slightly incline with respect to a separator 15A so as to apply an offset load onto the cell, forming cracks in the cell. Such offset load may be prevented by the deformation of the permeable member.

Figure 10:
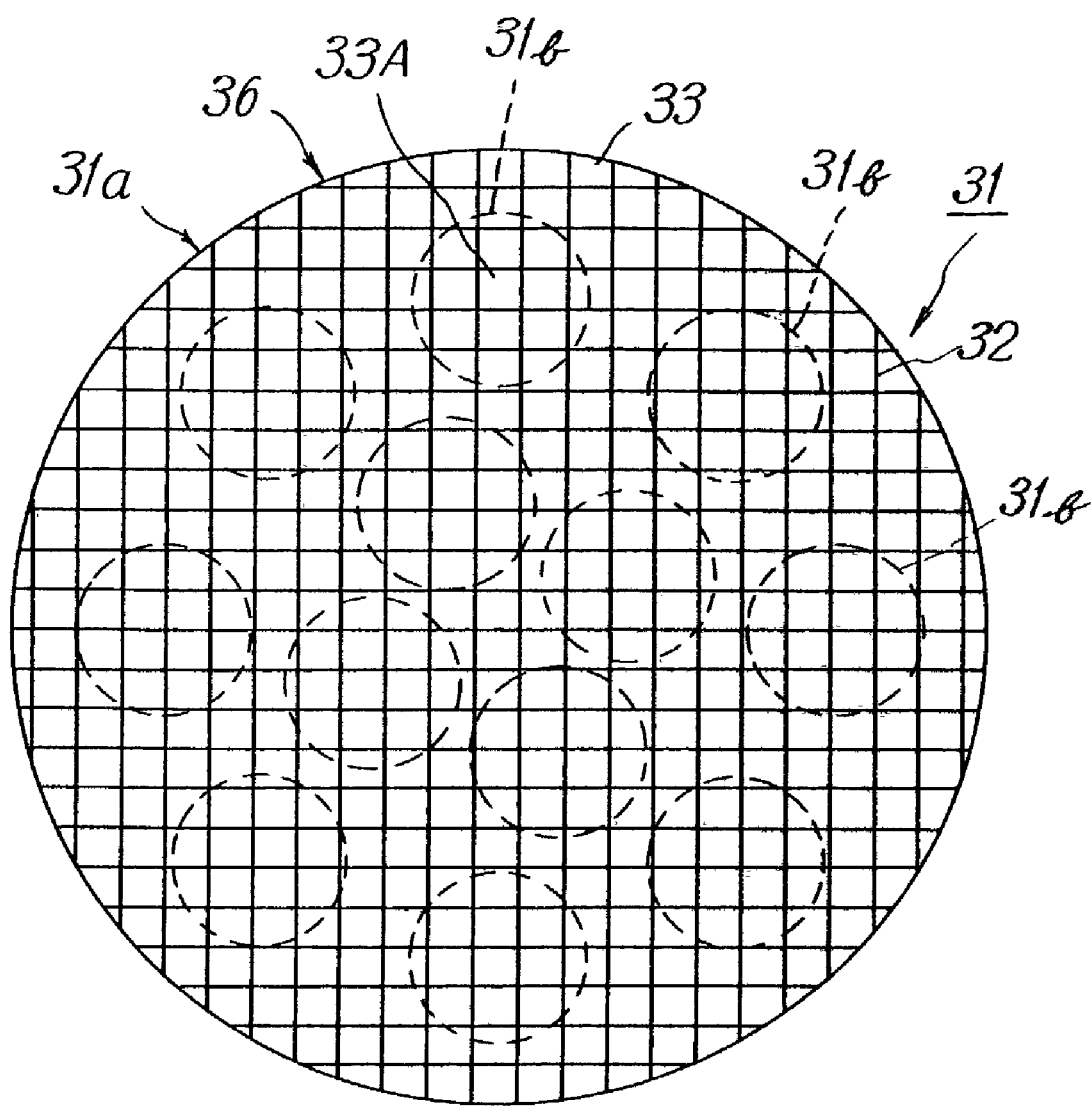
FIG. 10 is a plan view showing a mesh 31 used as an electrically conductive connecting member according to one embodiment of the present invention.
Figure 11:
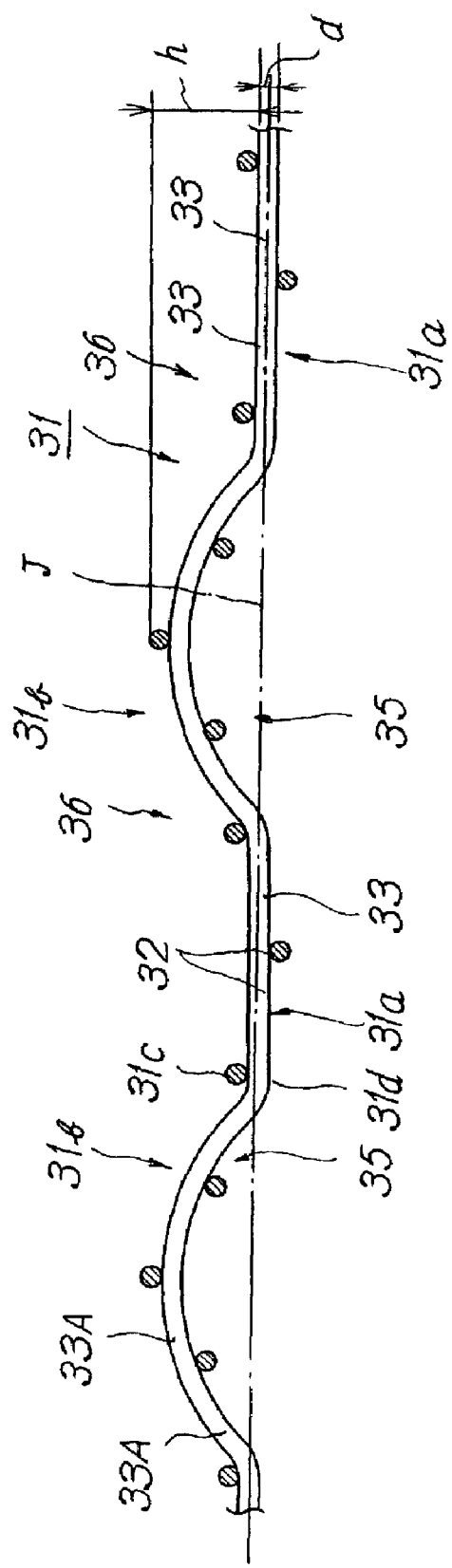
FIG. 11 is a cross-sectional view showing a part of the mesh 31 in FIG. 10 in an enlarged scale.
Figure 12:
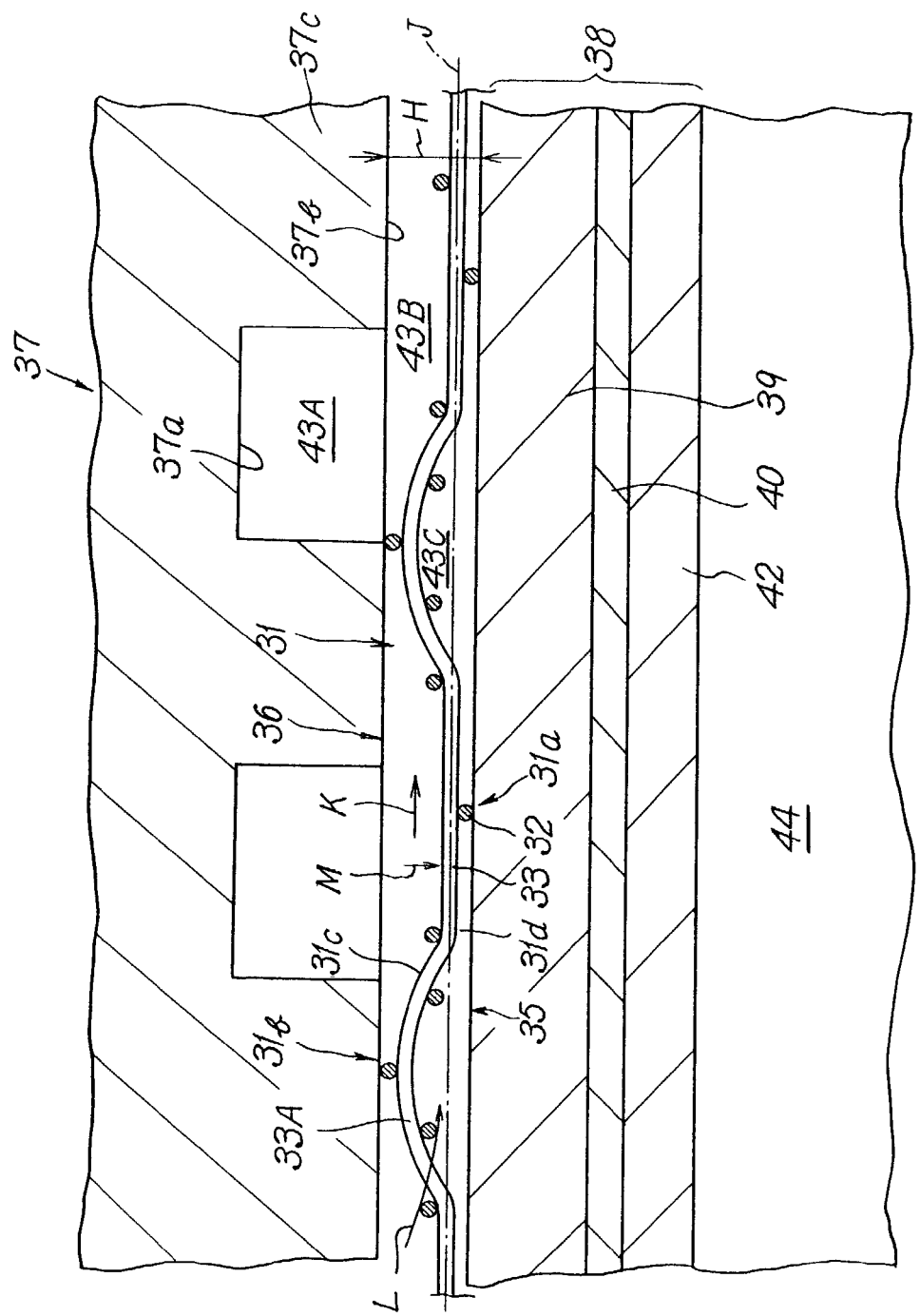
FIG. 12 is a principal cross-sectional view showing a state where the mesh 31 was intervened between a separator 37 and an electrochemical cell 38.
Figure 13:
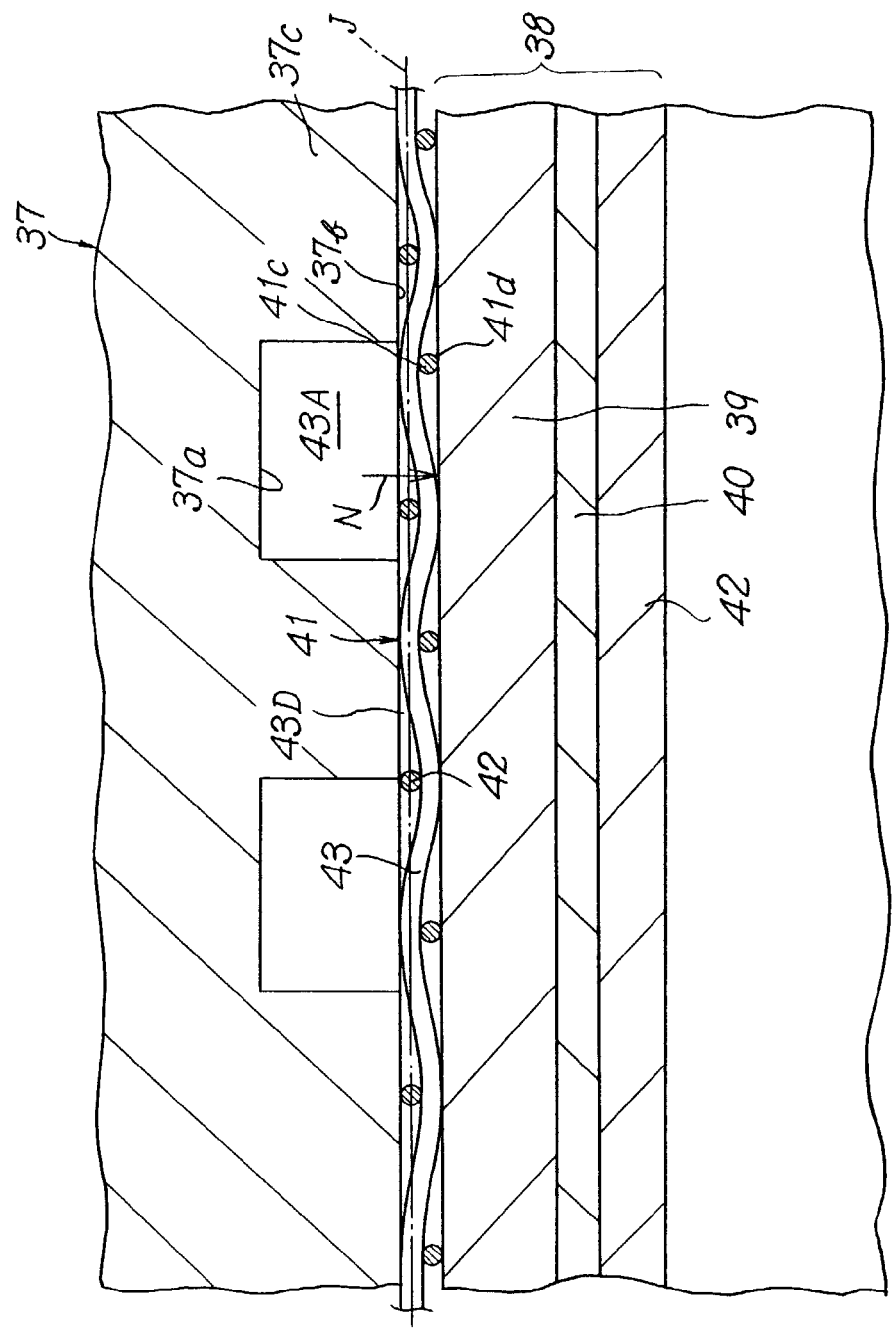
FIG. 13 is a principal cross-sectional view showing a state where non-emboss shape provided mesh 41 was intervened between the separator 37 and the electrochemical cell 38.

FIG. 10 is a plan view showing a connecting member 31 consisting of a mesh, according to one embodiment of the second aspect. FIG. 11 is a cross-sectional view showing a part of the mesh 31 of FIG. 10 in a large scale. FIG. 12 shows a state where a separator 37 and an electrochemical cell 38 are electrically connected to each other by using the mesh 31. FIG. 13 shows a state where the separator 37 and the cell 38 are electrically connected to each other using the mesh 41 without the emboss shape.

Although the planar shape of the mesh 31 is circular, this planar shape is not particularly limited. The mesh 31 may be obtained by braiding a large number of electrically conductive wires 32, and between a large number of electrically conductive wires 32, a large number of interstices (gaps) 33 and 33A are formed. Further, the cross-sectional shape of the electrically conductive wire 32 for the mesh 31 is circular, but the cross-sectional shape is not particularly limited and a round circular shape, oval shape, triangular shape, rectangular shape or hexagonal shape may be used. The braided shape in FIG. 10 is a plain weave. However, if necessary, a twill weave, a tatami weave, a clamp weave, or a net weave may be used. The mesh 31 has a flat shape before forming an emboss shape. The reference numeral J shown in FIGS. 11 and 12 shows a central plane of the mesh before forming an emboss shape. The electrically conductive wires 32 are braided along the central plane J. Emboss-shaped portions 31b are formed at given portions of the mesh 31. The reference numeral 31a is portions with the emboss shape not being provided. The portion 31a has a form before embossing. In this example, each of the emboss shape provided portions 31b has a substantially circular shape in plan view. The reference numeral 33A shows an interstice within the emboss shape provided portion 31b. The shape of the interstice 33A is slightly curved as compared with the shape of the interstice 33.

Since the emboss shape provided portions 31b are protruded on one side of the surface 31c of the mesh 31 when viewed from the central plane J before embossing, a space 35 is formed on a back side (the other side of the surface 31d) of the emboss shape provided portion 31b. The shape and depth of the space 35 are determined by the shape and height of the emboss shape portion 31b. A space 36 is surrounded by the emboss shape provided portion 31b.

In an example shown in FIG. 12, the mesh 31 is sandwiched in one gas passage between the separator 37 with grooves and the electrochemical cell 38. That is, in the separator 37 are formed elongated grooves 37a for supplying gas on one side and the interior of the groove 37a functions as a gas passage 43A. An elongated protrusion 37c is formed between the grooves 37a. The electrochemical cell 38 has, for example, a solid electrolyte film 40, one electrode 39 and the other electrode 42, which takes a flat plate shape as a whole. The cell 38 on one side is opposed to the separator 37, particularly a surface 37b of the protrusion 37c. Between the protruded surface 37b of the separator 37 and one electrode 39, a connecting member consisting of a mesh 31 is intervened. One surface 31c of the mesh 31 is opposed to the separator 37 and the other surface 31d of the mesh 31 is in contact with the one electrode 39. It is noted that another gas passage 44 is formed on the other electrode 42 side.

In this example, emboss shape provided portions 31b protruded on one surface 31c side are formed in the mesh 31, and the upper end of the emboss shape provided portion 31b is in contact with the protruded surface 37c of the separator 37. As a result, as shown in FIG. 12, spaces 43B and 43C each having a height of H are formed, and the spaces 43B and 43C function as one gas passage. The height H of the space 43B is the total of a width "d" of the non emboss shape provided portion 31a and a height "h" of the emboss shape provided portion 31b of the mesh, as shown in FIG. 11.

By such structure, the one gas flows within the passage 43A and, at the same time, flows within the passage 43B formed by the mesh 31 and the separator 37 as shown by an arrow K. One gas then contacts one electrode 39 through the mesh interstices 33 in the non-emboss shape provided portion 31a from the space 43B as shown by an arrow M. At the same time, the gas flowing in the space 43B is passed through the mesh interstices 33A in the emboss shape provided portion 31b, as shown by an arrow L. The gas then flows into the flow passage 43C (space 35) between the emboss shape provided portion 31b and the one electrode 39, so that the gas contacts the one electrode 39 within the flow passage 43C.

On the other hand, when emboss shape provided portions are not provided in the mesh, the mesh 41 braided flatly is sandwiched between the separator 37 and cell 38, as shown in FIG. 13. One side 41c of the mesh 41 contacts a protruded surface 37b of the separator 37. The other side 41d of the mesh 41 contacts a surface of the one electrode 39. When gas is supplied to the passage 43A in this state, this gas contacts the one electrode 39 as shown by an arrow N from the passage 43A. However, the mesh interstices 43D between the protruded surface 37b and the electrode 39 is surrounded by electrically conductive wires 42. That is, the electrically conductive wires 42 block the flow of gas from the passage 43A into a gap 43D between the protruded surface 37b and the electrode 39. Thus, in the area of the passage 43A (groove 37a), gas can be supplied to the electrode of the electrochemical cell. However, in the area of the protruded surface 37b, gas is hardly supplied to the electrode.

Further, even when the pressing direction for the assembled cells is slanted from the stacking direction A in the present invention, the emboss shape provided portions are flatly and regularly formed as shown in FIG. 10. It is thus possible to prevent the crush of the mesh in a specific direction and the lateral shift of the separator and electrochemical cell.

The material for the connecting member according to the second aspect must be stable with respect to a gas to which this member is exposed, at an operating temperature of an electrochemical cell. Specifically, materials stable against an oxidizing gas include platinum, silver, gold, palladium, a nickel-based alloy such as Inconel, nichrom and the like, a cobalt-based alloy such as Haynes alloy and the like, and an iron-based alloy such as stainless steel and the like. Materials which are stable against a reducing gas include nickel and nickel-based alloy, in addition to the above-described materials stable against an oxidizing gas.

An emboss shape provided portion means a portion having an optional shape obtained by a plastic deformation process such as embossing. The process for imparting an emboss shape may be any forming process for press-deforming a part of a permeable member such as a mesh to form the above-mentioned protruded portion (embossed portion) and a recess 35. The concrete performance process is not limited. Typically, the emboss shape may be provided by pressing the permeable member such as a mesh with an embossing die, such as a deep drawing process or the like.

A permeable material forming a connecting member is not limited, as far as it has permeability. However, preferably it can be plastically deformed during pressing. The permeable materials are preferably as follows.

Mesh (Mesh-Like Object)

Metallic plate in which a large number of vent holes are regularly formed: Preferably, a punching metal, an etching metal, an expanded metal (expand).

It is preferred that the emboss shape provided portions are regularly formed in plan view. It is particularly preferable that the emboss shape provided portions are arranged in at least two directions in plan view.

In a permeable material (for example a mesh) forming a connecting member, the height h (see FIG. 11) of the emboss shape provided portion from the non-emboss shape provided portion is not particularly limited. However, from the viewpoint of improving the gas flow, the height is preferably 0.3 mm or more, and more preferably 0.5 mm or more. However, when the height h is too large, the volume of a space for the gas flow is increased. Thus, the volume of a useless gas, which is not utilized by the cell and is passed therethrough, is possibly increased and the generating efficiency of the cell per a unit volume is possibly reduced. From this viewpoint, the height h is preferably 5 mm or less and more preferably 3 mm or less.

The dimension of each emboss shape provided portion, the number of the portions and the planar shape of each portion are not particularly limited, and a round circular shape, an oval shape, a triangular shape, a rectangular shape, and a hexagonal shape in a plan view may be used.

Figure 14:
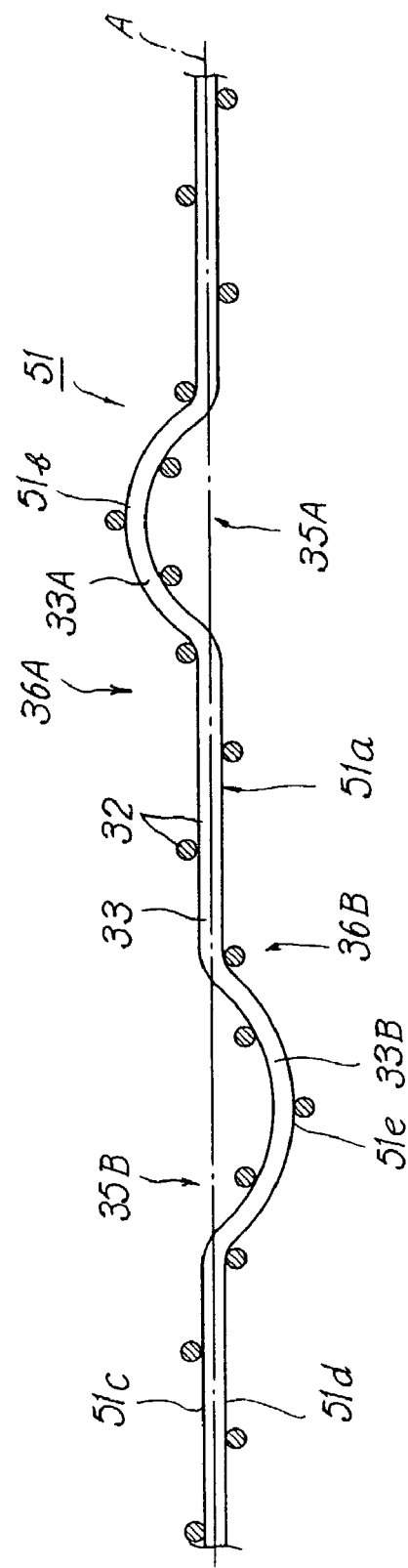
FIG. 14 is a cross-sectional view showing a part of a mesh 51 according to another embodiment of the present invention.
Figure 15:
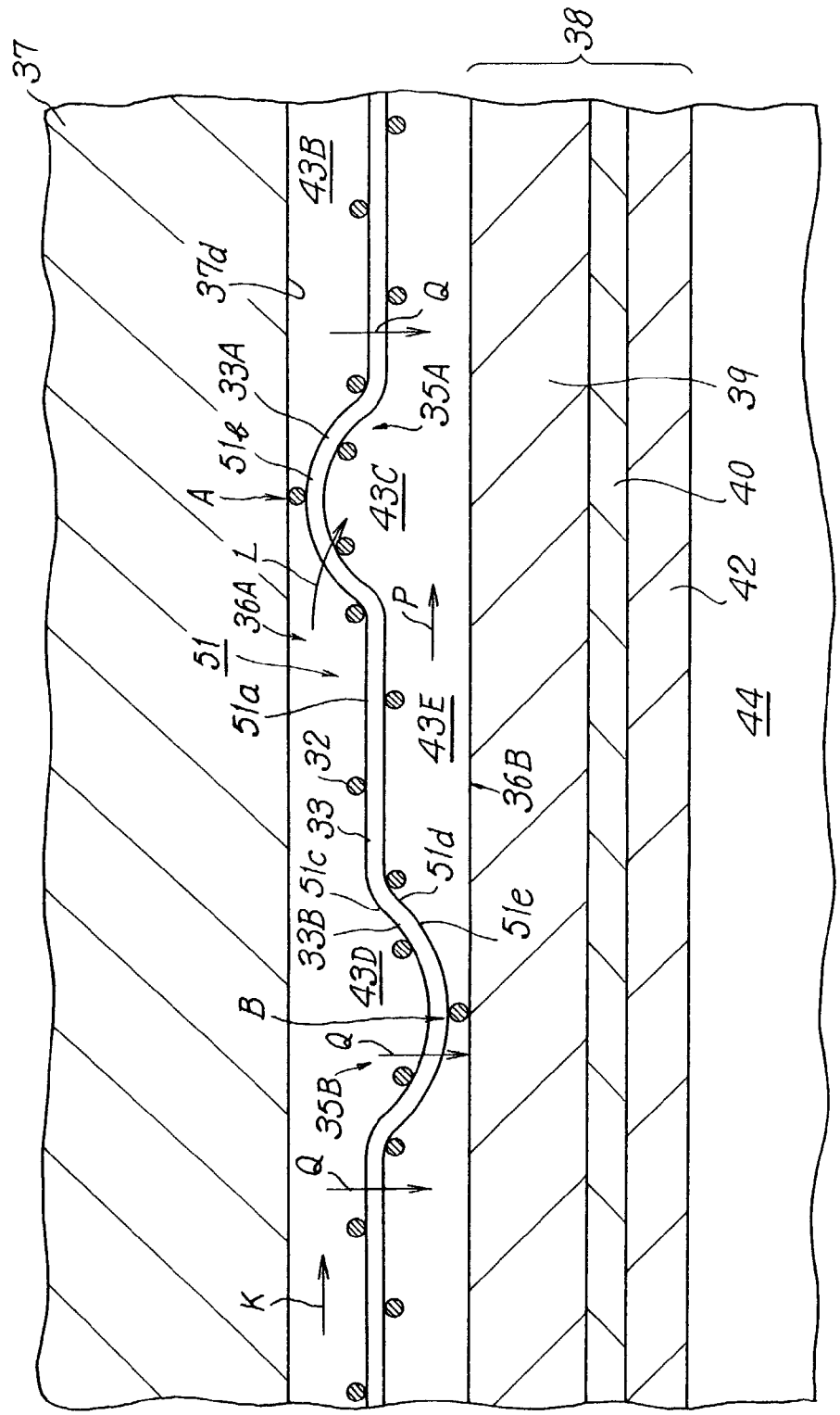
FIG. 15 is a principal cross-sectional view showing a state where a mesh 51 was intervened between the separator 37 and the electrochemical cell 38.

In a preferred embodiment, the emboss shape provided portion comprises a first emboss shape provided portion protruded on one surface side of the permeable material, and a second emboss shape provided portion protruded on the other surface side of the permeable material. Accordingly, the pressure loss of gas flow can be further reduced. FIGS. 14 and 15 show this embodiment. FIG. 14 is a part of cross-sectional view of a mesh 51, and FIG. 15 shows a state where the mesh 51 is sandwiched between an electrochemical cell 38 and a separator 37.

The planar shape of the mesh 51 is for example circular. The mesh 51 can be obtained by braiding a large number of electrically conductive wires 32. Between the large number of electrically conductive wires 32 are formed a large number of mesh interstices (gaps) 33, 33A and 33B. The mesh 51 has a flat shape before imparting the embossing shape to the mesh. In a non-emboss shape provided portion 51a, the electrically conductive wires 32 are braided along the central plane J.

Emboss shape provided portions 51b and 51e are formed at given positions in the mesh 51. The emboss shape provided portions 51b are protruded on one surface 51c side of the mesh 51 when viewed from the central plane J before imparting an embossing shape to the mesh. A space 35A is thus formed on the back side (the other surface 51d side) of the emboss shape provided portion 51b. The shape and depth of the space 35A are determined by the shape and depth of the emboss shape provided portion 51b. A space 36A is surrounded by the emboss shape provided portion 51b and the non-emboss shape provided portion 51a.

The emboss shape provided portions 51e are protruded on the other surface 51d side of the mesh 51 when viewed from the central plane J before imparting an embossing shape to the mesh. A space 35B is thus formed on the back side (the one surface 51c side) of the emboss shape provided portion 51e. The shape and depth of the space 35B are determined by the shape and depth of the emboss shape provided portion 51e. A space 36B is surrounded by the emboss shape provided portion 51e and the non-emboss shape provided portion 51a.

In the example shown in FIG. 15, a connecting member consisting of a mesh 51 is intervened between a surface 37d of the separator 37 and one electrode 39. One surface 51c of the mesh 51 is opposed to the separator 37 and the other surface 51d of the mesh 51 is in contact with the one electrode 39.

In the present example, an emboss shape provided portion 51b protruded on one surface 51c side is formed in the mesh 51, and the upper end of the emboss shape provided portion 51b is in contact with one surface 37d of the separator 37. As a result, as shown in FIG. 15, a space 43B is formed and the space 43B functions as a gas flow passage. Further, an emboss shape provided portion 51e protruded on the other surface 51d side is formed in the mesh 51, and the portion 51e is in contact with a surface of the one electrode 39. As a result, a space 43E is formed and the space 43E functions as a gas flow passage.

Gas flows as shown by an arrow K within the flow passage 43B formed by the mesh 51 and the separator 37. Then, the gas is passed through the mesh interstices 33A of the emboss shape provided portion 51b as shown by an arrow L and flows into the passage 43c formed by the space 35A. The gas then flows into the passage 43E to be supplied to the surface of the electrode 39. Also, the gas is passed through the spaces 43B and the mesh interstices 33 and 33B as shown by an arrow Q, and flows into the flow passage 43E. The gas flows inside the flow passage 43E as shown by an arrow P and at the same time is brought into contact with the electrode 39.

As shown in FIG. 15, when the separator 37 is pressed toward the electrochemical cell 38 to enhance the electrical connection thererebetween, the connection between a point A and a point B may be improved. When the separator 37 is further pressed toward the cell 38 with a larger load, the connecting member is deformed. Such deformation prevents an excessive load beyond a given value applied on the cell 38 and thus the crack formation in the cell.

As can be seen from the above-mentioned gas flow, there is no particular portion which prevents the contact between the gas and one electrode 39. Thus, this structure improves the electrical contact so that the breakage of the cell does not occur.

Figure 16:
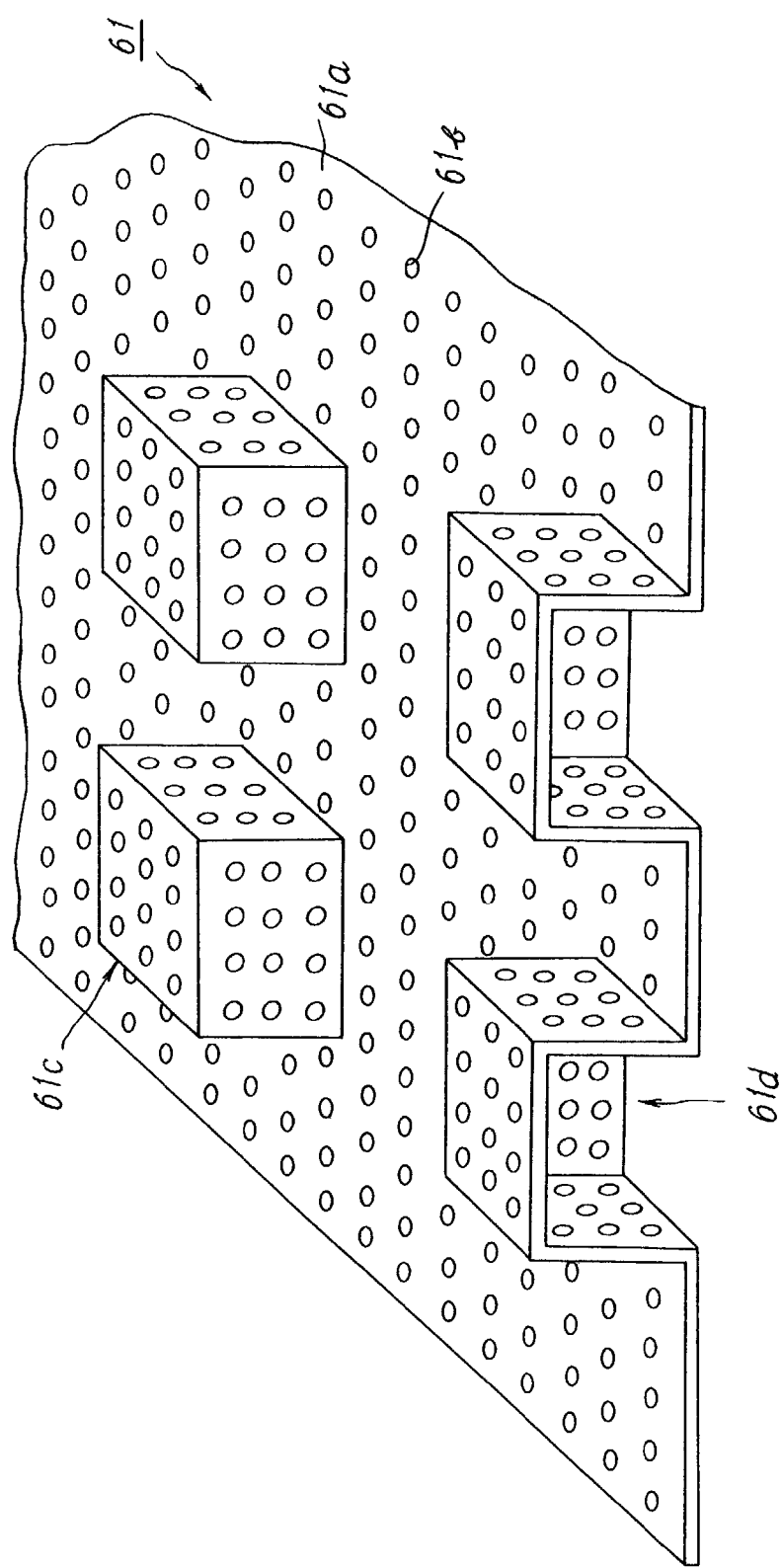
FIG. 16 is a perspective view showing an electrically conductive connecting member 61 consisting of a punching metal.

A connecting member 61 in FIG. 16 is formed of a punching metal. A flat plate-like portion 61a of the punching metal 61 is provided with a number of vent holes 61b. A plurality of emboss shape provided portions 61c are protruded from the flat-plate like portion 61a so that they are regularly arranged. The reference numeral 61d denotes a recess on the back side of the portions 61c.

Figure 17:
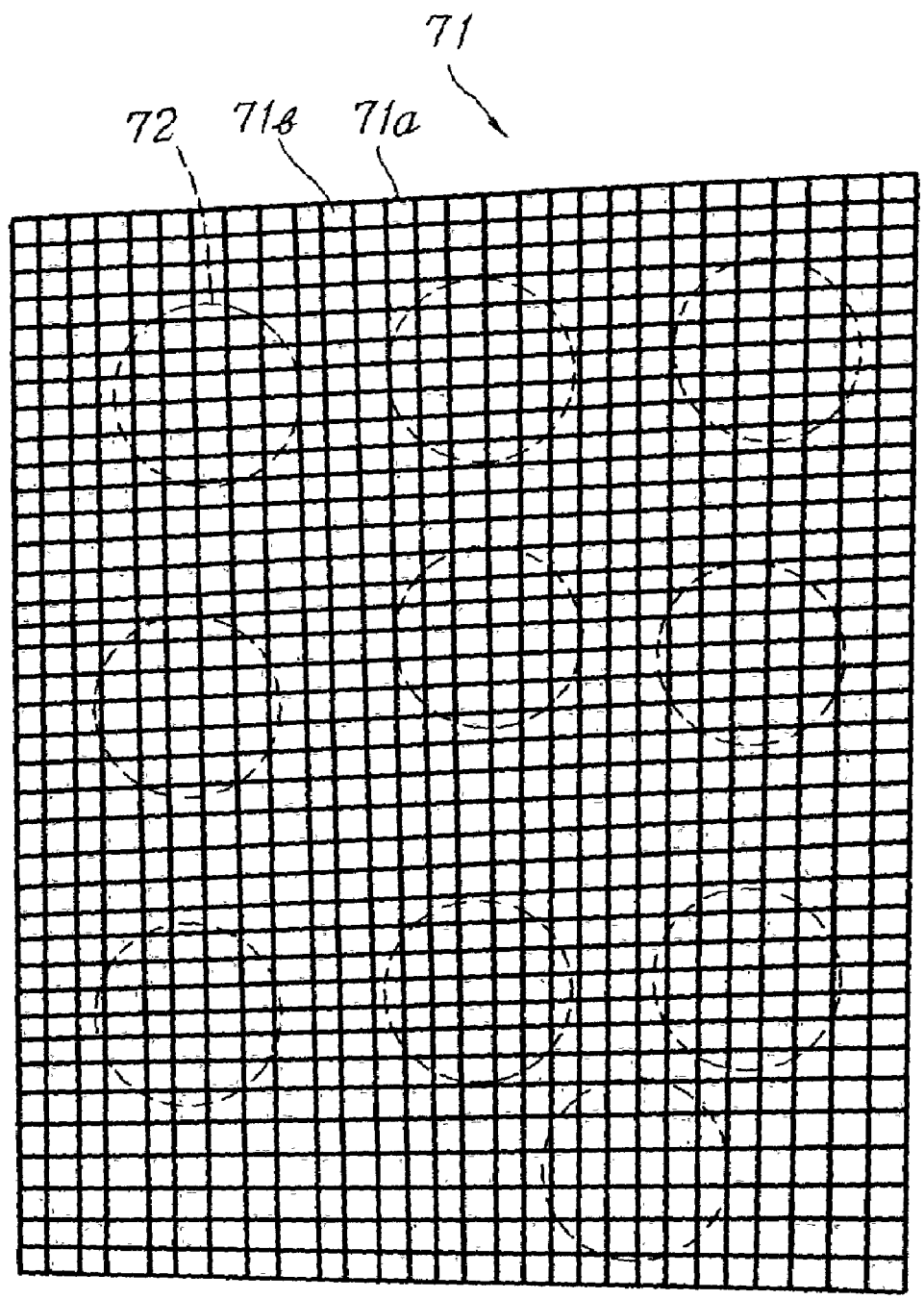
FIG. 17 is a perspective view showing an electrically conductive connecting member 71 consisting of an expanded metal.

A connecting member 71 in FIG. 17 is formed of so-called an expanded or perforated metal. The expanded metal member 71 is made of metallic wires 71a molded in a lattice shape. Between the metallic wires 71a are formed a number of vent holes 71b. The reference numeral 72 denotes emboss shape provided portions.

As described above, according to the second aspect of the present invention, a novel electrochemical system with an electrochemical cell and a connecting member contacting the cell is provided. According to the system, the residence of a gas within the connecting member may be prevented, and a region on an electrode surface of the cell which is not in contact with gas may be reduced. Further, the contact of the connecting member and the cell may be improved so as to prevent the breakage of the cell.

(Application of the Above Descriptions of the Second Aspect to an Electrochemical System According to the First Aspect)

All the descriptions of the second aspect described above referring to FIGS. 10 to 17 may be applied to an electrochemical system of the first aspect already described.

(Detailed Description of a Separator and Stack Structure Preferred for the First and Second Aspects of the Present Invention)

FIGS. 18 to 22 show preferable separators each of which is provided with gas supply passages.

Figure 18:
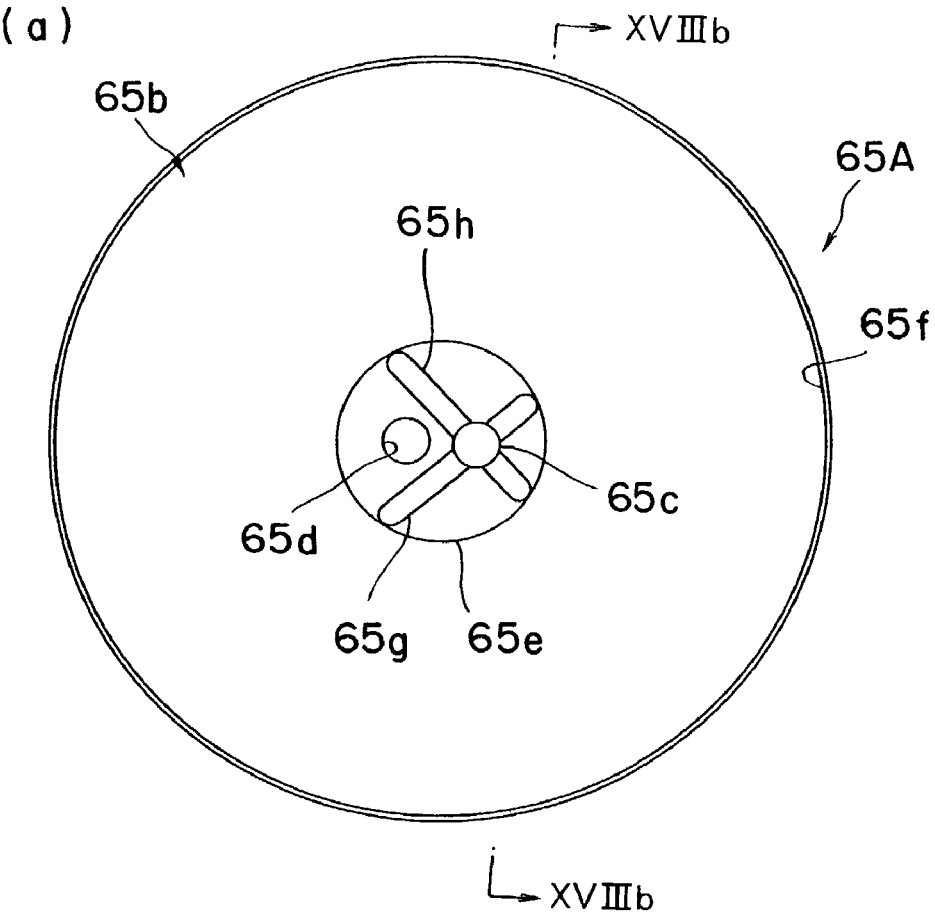
FIG. 18 (*a*) is a plan view showing a separator 65A.
Figure 18:
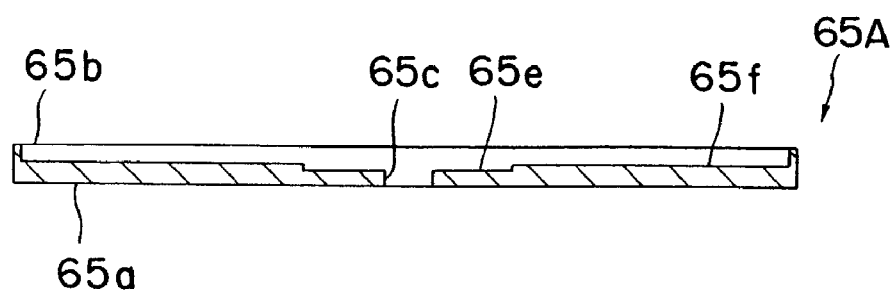

FIG. 18 (a) is a plan view showing a separator 65A, and FIG. 18 (b) is a cross-sectional view taken along a line XVIIIb—XVIIIb of the separator 65A. The separator 65A includes gas supply holes 65c and 65d, and each gas supply hole communicates with a gas supply hole of an electrochemical cell not shown, as described above. Further, each gas supply hole communicates with a substantially circular recess 65e and it functions as a receiving portion for a sealing member. Further, the gas supply hole 65c is provided with elongated gas distribution grooves 65g and 65h as gas supply passages. On the main surface 65b side of the separator 65A is formed a recess 65f substantially all over the separator surface. Each of the gas distribution grooves 65g and 65h communicate with the recess 65f. The recess 65f functions as a receiving portion for a connecting member, and has an effect to allow gas to diffuse to the entire surface of the separator 65A.

One gas or the other gas flows in the gas supply hole 65c, penetrates through the gas distribution grooves 65g and 65h, and then flows over the surface of a ring-shaped gas distributing recess 65f. A gas flow passage may be formed in the recess 65f. The main surface 65b of the separator 65A is opposite to an electrode of the electrochemical cell, as described above.

Figure 19:
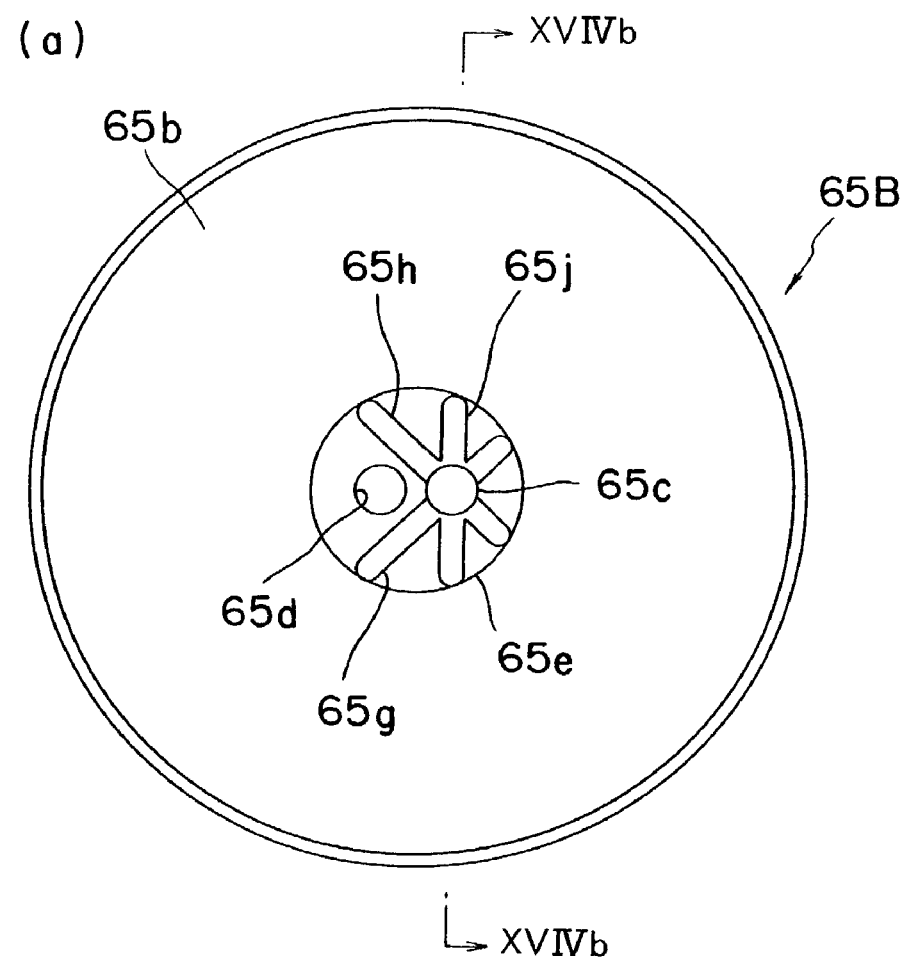
FIG. 19 (*a*) is a plan view showing a separator 65B.
Figure 19:
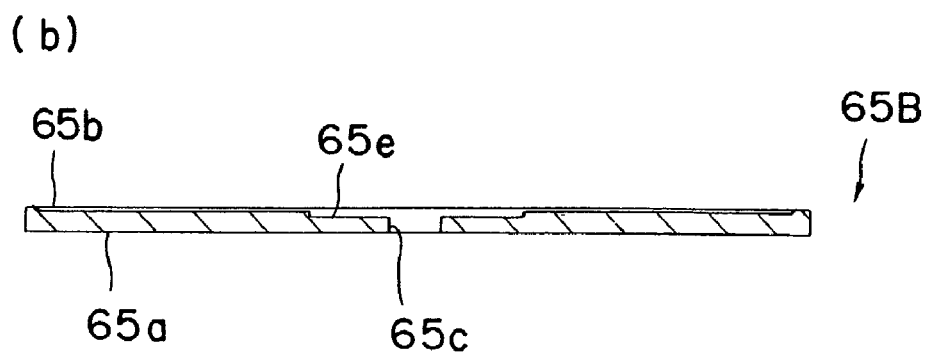

FIG. 19 (a) is a plan view showing a separator 65B, and FIG. 19 (b) is a cross-sectional view taken along a line XVIVb—XVIVb of the separator 65B. The separator 65B is further provided with an elongated gas distribution groove 65j communicating with the gas supply hole 65c.

Figure 20:
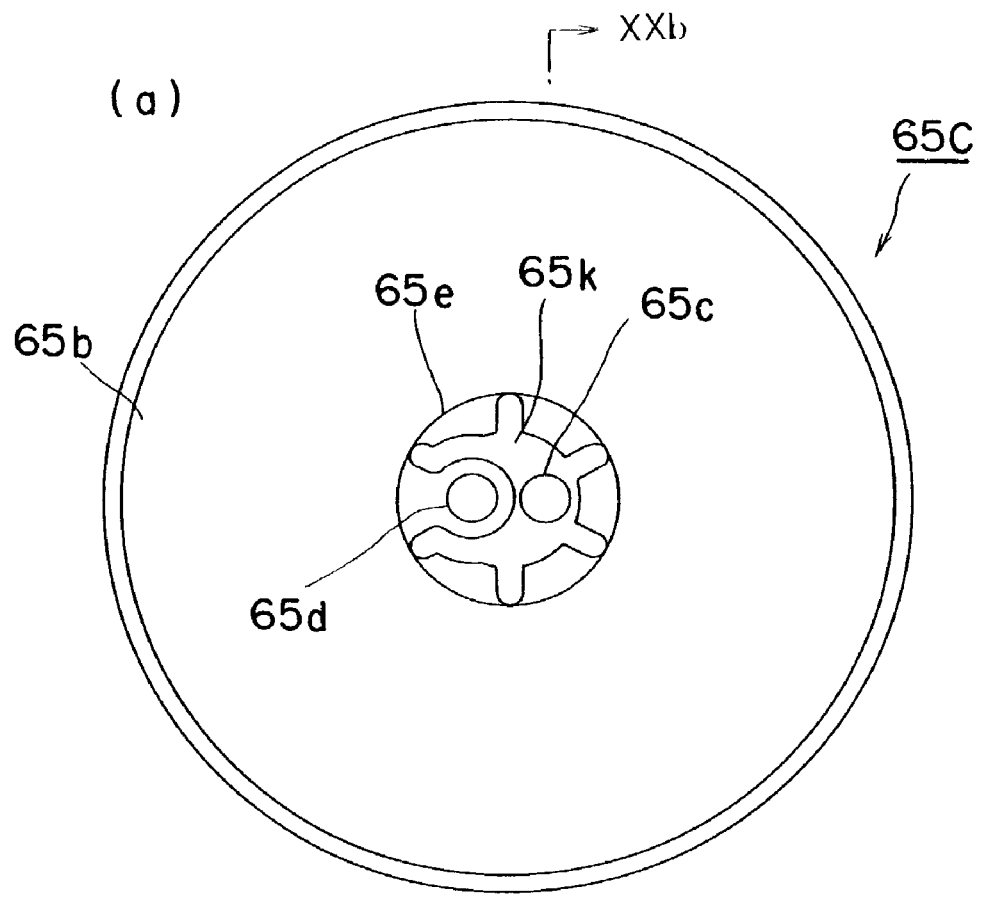
FIG. 20 (*a*) is a plan view showing a separator 65C.
Figure 20:
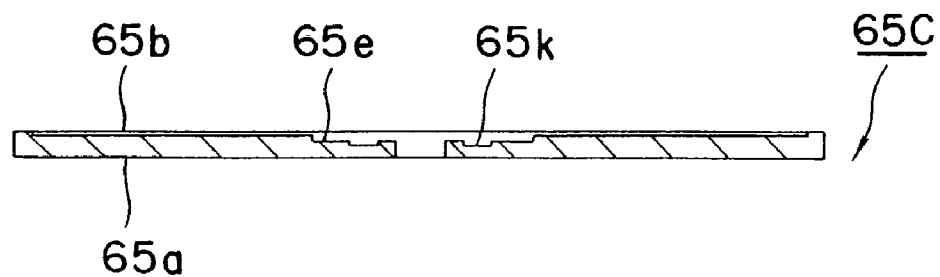

FIG. 20 (a) is a plan view showing a separator 65C, and FIG. 20 (b) is a cross-sectional view taken along a line XXb—XXb of the separator 65C. The separator 65C is not provided with an elongated gas distribution groove in a recess 65e, and instead is provided with an arc-shaped gas distribution groove 65k.

Figure 21:
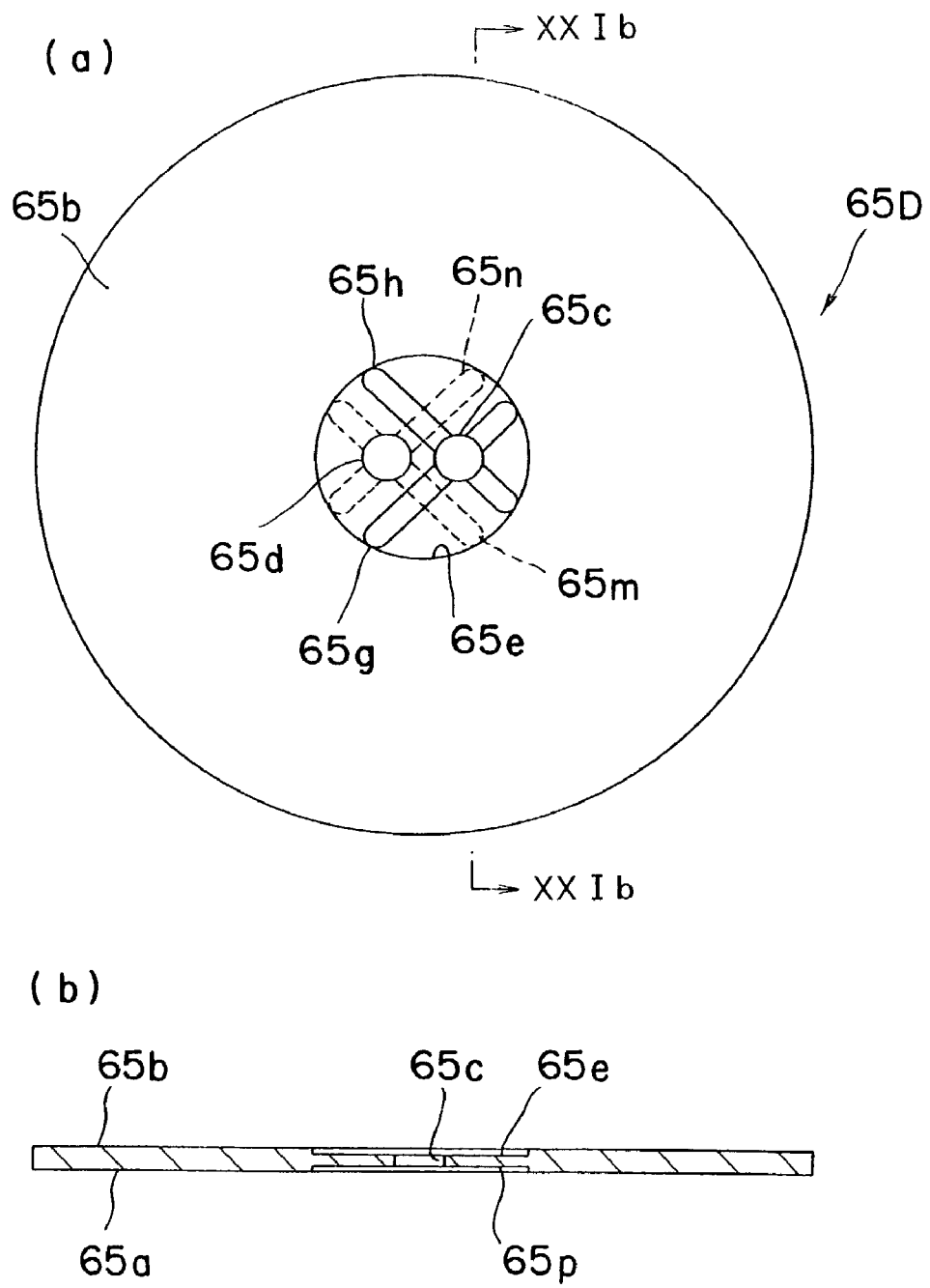
FIG. 21 (*a*) is a plan view showing a separator 65D when viewed from the main surface 65*b* side thereof.
Figure 22:
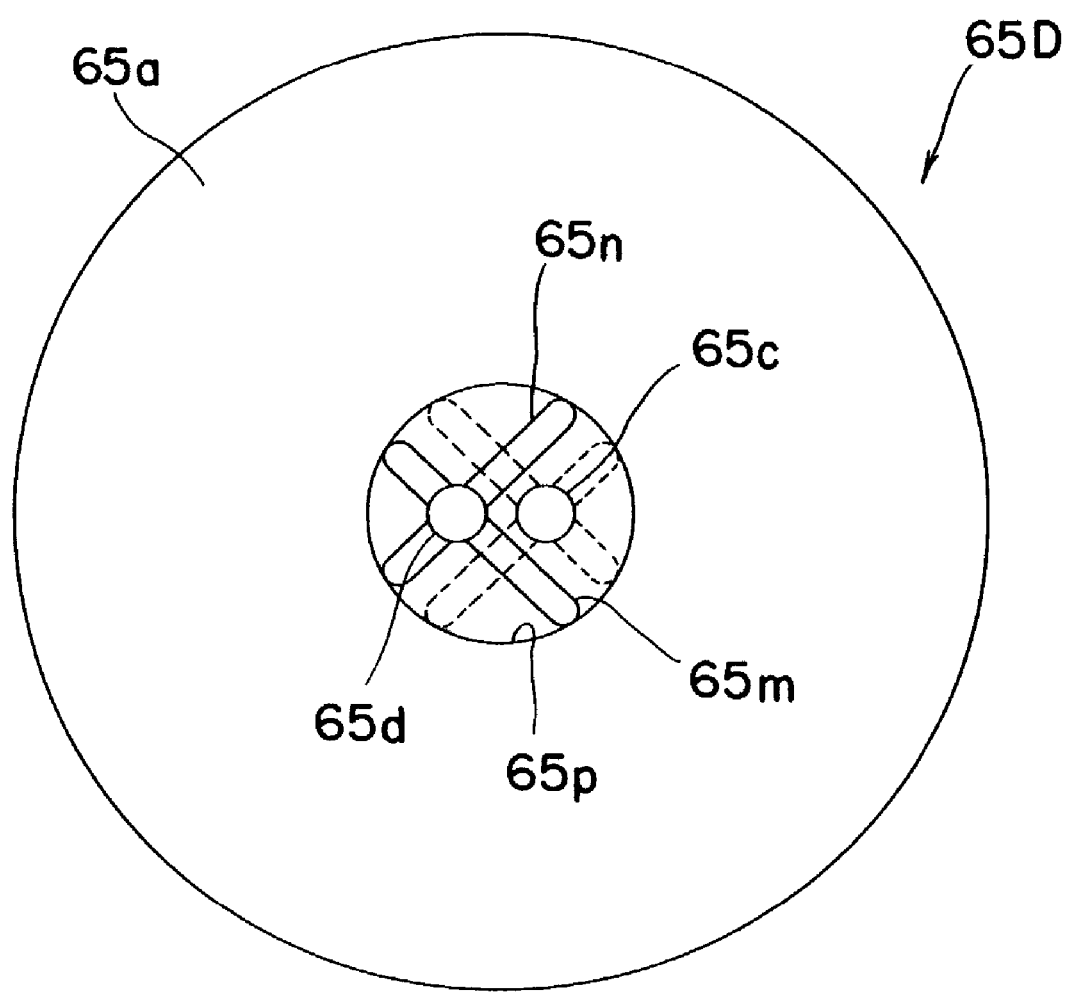
FIG. 22 is a plan view of the separator 65D when viewed from the main surface 65*a* side thereof.
Figure 23:
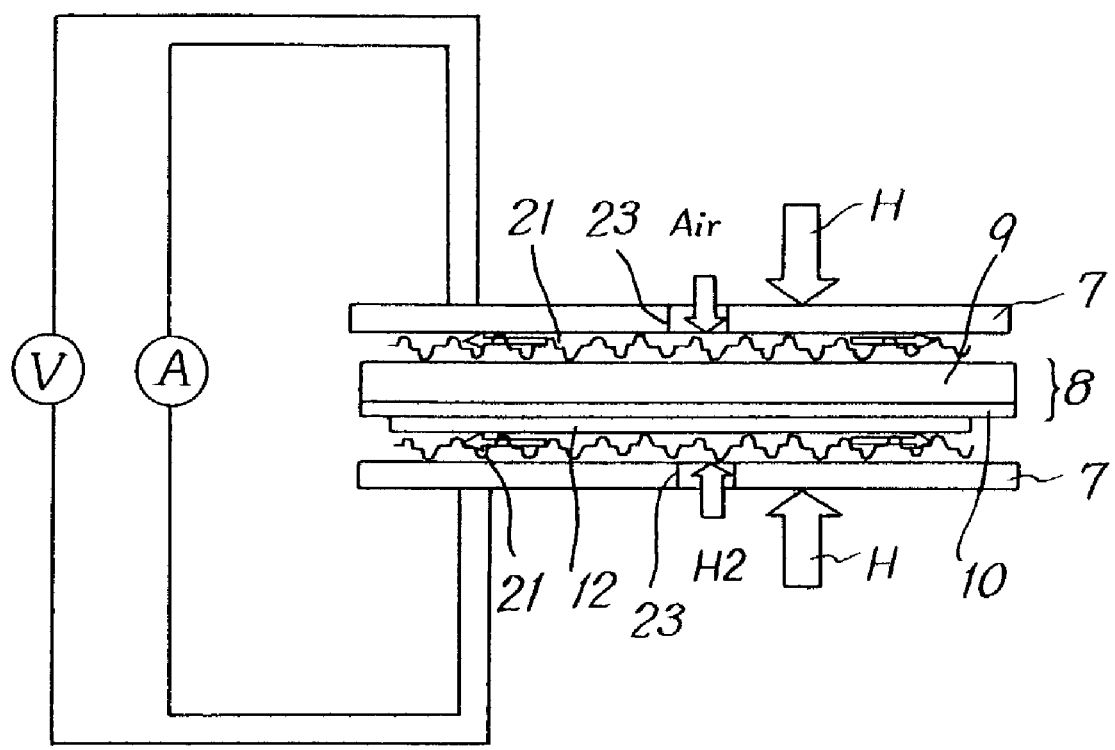
FIG. 23 is a schematic view showing an experimental device for power generation tests.

In each of separators of FIGS. 18 to 20, a gas distribution groove for either of one gas and the other gas is provided in the separator. However, the gas distribution grooves for both gases can be provided in the sides of one and the other main faces of the separator, respectively. FIGS. 21 and 22 relate to this embodiment.

FIG. 21 (a) is a plan view of a separator 65D when viewed from the main surface 65b side, and FIG. 21 (b) is a cross-sectional view of the separator 65D taken along a line XXIb—XXIb thereof. FIG. 22 is a plan view of the separator 65D when viewed from the main surface 65a side.

The separator 65D is provided with gas supply holes 65c and 65d, and each gas supply hole communicates with a gas supply hole of an electrochemical cell not shown, as described above. Further, each gas supply hole communicates with a substantially circular recess 65e on the main surface 65b side and also communicates with a substantially circular recess 65p on the main surface 65a side. The respective recess portions 65e and 65p function as receiving portions for the sealing members, respectively. Further, the inside of the recess 65e is provided with elongated gas distribution grooves 65g and 65h as the gas supply passages. Also, the inside of the recess portion 65p is provided with elongated gas distribution grooves 65m and 65n as the gas supply passages.

One gas flows through the gas supply hole 65c, and then is passed through the gas distribution grooves 65g and 65h, so that it flows through a space between the separator 65D and the electrochemical cell. The other gas flows through the gas supply hole 65d, and then passes through the gas distribution grooves 65m and 65n, so that it flows through a space between the separator 65D and the electrochemical cell.

(Description of Preferred Embodiments of the First and Second Aspects of the Present Invention)

Preferred embodiments common for the first and second aspects will be described below.

In a preferred embodiment, one gas is an oxidizing gas and the other gas is a reducing gas.

The oxidizing gas is not particularly limited, as far as oxygen ions may be supplied to a solid electrolyte film from the gas. The gas includes air, diluted air, oxygen and diluted oxygen.

The reducing gas includes hydrogen, carbon monooxide, methane or the mixture thereof.

An electrochemical cell means a cell performing an electrochemical reaction, in the invention.

For example, an electrochemical cell includes an oxygen pump and a high temperature vapor electrolyte cell. The high temperature vapor electrolyte cell can be used as a hydrogen production device, and also as a removing system of water vapor. Further, the electrochemical cell can be used as a decomposition cell for $NO_X$ and/or $SO_X$. This decomposition cell can be used as a purification apparatus for discharge gas from motor vehicles, power generation devices or the like. In this case, oxygen in the discharge gas is removed through a solid electrolyte film while $NO_X$ is electrolyzed into nitrogen and oxygen, and the oxygen thus produced by this decomposition can be also removed. Further, by this process, vapor in the discharge gas is electrolyzed to produce hydrogen and oxygen, and the produced hydrogen reduces $NO_X$ to $N_2$. Further, in a preferable embodiment, the electrochemical cell is a solid oxide fuel cell.

The one electrode and the other electrode each may be a cathode or an anode.

The material for a solid electrolyte layer is not limited particularly, and may be yttria-stabilized zirconia or yttria partially-stabilized zirconia. In the case of $NO_X$ decomposition cells, cerium oxide is also preferable.

The cathode material is preferably lanthanum-containing perovskite-type complex oxide, more preferably lanthanum manganite or lanthanum cobaltite, and most preferably lanthanum manganite. Into lanthanum cobaltite and lanthanum manganite, strontium, calcium, chromium, cobalt, iron, nickel, aluminum or the like may be doped. Further, the cathode material may be palladium, platinum, ruthenium, platinum-zirconia cermet, palladium-zirconia cermet, ruthenium-zirconia cermet, platinum-cerium oxide cermet, palladium-cerium oxide cermet, and ruthenium-cerium oxide cermet.

As the anode materials, nickel, palladium, platinum, nickel-zirconia cermet, platinum-zirconia cermet, palladium-zirconia cermet, nickel-cerium oxide cermet, platinum-cerium oxide cermet, palladium-cerium oxide cermet, ruthenium, ruthenium-zirconia cermet and the like are preferable.

The kind of ceramic material for the holding member is not particularly limited. However, when the holding member is made of electrically conductive ceramics, the anode and cathode of the cell might be short-circuited through the holding member 1. Thus, such ceramics preferably have insulating properties. Further, when an oxidizing gas or reducing gas is used, a material which is resistive against the oxidizing gas or reducing gas at an operating temperature of the cell is preferred for the holding member. From this viewpoint, magnesia-alumina spinel and zirconia are preferable. Further, ceramics having a thermal expansion coefficient of the same level as that of the cell is preferable. When an Ni—YSZ cermet is used as the cathode, magnesia-alumina spinel of $MgO/Al_2O_3$=1–2.3 (weight ratio) is preferable.

Although a material for the sealing member between the cell and the holding member is not particularly limited, it may preferably be a material which is resistive against an oxidizing gas or reducing gas at an operating temperature of the cell. The material may preferably have a thermal expansion near that of the cell. From this viewpoint, a glass seal is preferable. The sealing between the separator and the holding member is preferably carried out by mechanical sealing with a gasket.

The design of an electrochemical cell is not particularly limited. The cell has three layers including two electrodes and one solid electrolyte layer in the above examples. The cell may have a porous supporting layer or plate other than the electrodes and solid electrolyte layer.

In FIGS. 6 and 8, a connecting member for electrically connecting adjacent separators 15A and cells 9 is not shown. A gas permeable connecting member having electrical conductivity is positioned within each of the spaces 19 and 29 so as to electrically connect the adjacent electrochemical cells 9 with each other. For example, as shown in a schematic view of FIG. 9, a gas permeable connecting member 30 is sandwiched between the adjacent cells 9 so that the cells are electrically connected in series. Such permeable connecting member includes a felt, a mesh, a needle-shaped body and a sponge-shaped body. The connecting member may, of course, be a connecting member according to the second aspect of the present invention.

The material for a separator may be resistive against the one and the other gases. The material may preferably be, for example, a complex oxide having perovskite structure containing lanthanum, such as lanthanum chromite. Further, in the case of a metallic separator, the material for the separator includes a nickel-based alloy such as Inconel, nichrom or the like, a cobalt-based alloy such as Haynes alloy, and an iron-based alloy such as stainless steel. It may be a material which is resistive against a reducing gas including nickel and a nickel-based alloy.

EXAMPLES

Further specific experimental results will be described below.

(Preparation of a Fuel Electrode Substrate)

3 parts by weight of an organic binder and 100 parts by weight of water were added to 50 parts by weight of nickel oxide powder and 50 parts by weight of 8 mol % yttria-stabilized zirconia powder and were wet-mixed in a ball mill to obtain a mixture. Then, the mixture was dried and granulated. The granulated powder was press-molded to produce a green molded body (a molded body for a fuel electrode) having a length of 70 mm, a width of 70 mm and a thickness of 3 mm. This molded body was fired at 1400° C. for 2 hours. This fired body was worked to have a form having a length of 50 mm, a width of 50 mm and a thickness of 1 mm, and the obtained product was used as a fuel electrode substrate.

(Preparation of Solid Electrolyte Film)

8 mol % yttria-stabilized zirconia spray coating powder having an average particle diameter of 20 μm was charged into the plasma flame of a power of 40 kw by a plasma spray coating process to form a solid electrolyte film having a thickness of 50 μm on the fuel electrode substrate. After that, the film was heat-treated at 1350° C. for 2 hours to densify the electrolyte film.

(Preparation of Air Electrode)

100 parts by weight of lanthanum-manganite powder having an average particle diameter of 3 μm, 3 parts by weight of alkyl acetated polyvinyl alcohol and 30 parts by weight of terpineol were mixed in an alumina mortar to make paste. The mixed paste was applied by a screen printer in a length of 40 mm, a width of 40 mm and a thickness of 30 μm to form a film. This layer was dried and fired at a maximum temperature of 1250° C. for 1 hour to form an air electrode.

(Preparation of a Connecting Member)

100 mesh stainless mesh was deep-drawn with a punch having a diameter of 3 mm. Thus, an uneven cross-sectional shape was provided to the mesh as shown in FIG. 5.

(Power Generation Test)

FIG. 22 shows a state where a mesh 51 is sandwiched between an electrochemical cell 38 and a separator 37 in a power generation device and is loaded in a direction A. The electrochemical cell assembled as shown in FIG. 22 was set in an electric furnace. While allowing argon gas to pass on a reducing side and air to pass on an oxidizing side, the furnace was heated to 800° C. and argon was substituted with hydrogen on the reducing side. Then, while allowing air of 1 L/min and hydrogen of 1 L/min to flow, current-voltage properties were measured, whereby a maximum power of 0.2 W/cm$^2$ was obtained. After the measuring, no breakage of the cell was observed. In comparison with it, non-emboss shape-formed 200 mesh stainless steel mesh was substituted for the mesh 51 and the current-voltage properties were measured. A maximum power of 0.05 W/cm$^2$ was obtained.

The present invention has been explained referring to the preferred embodiments. However, the present invention is not limited to the illustrated embodiments which are given by way of examples only, and may be carried out in various modes without departing from the scope of the invention.

The invention claimed is:

1. A holding member for holding a planar electrochemical cell having a first main face and a second main face, said cell being made of a ceramic material with a through hole formed therein:
    wherein said holding member comprises an integrated body made of a ceramic material and comprises a planar main body, a protruded portion protruding from said main body, a first supply hole formed in said holding member for supplying a first gas and a second supply hole formed in said holding member for supplying a second gas, each of said first supply hole and said second supply hole extends through said main body and through said protruded portion between a first surface of said holding member and a second surface of said holding member, and said main body has a sealing surface against said first main face of said cell while said protruded portion is inserted into said through hole.

2. The member of claim 1, wherein said main body comprises a gas passage communicating with said first supply hole and a space over said cell.

3. The member of claim 1, wherein said protruded portion comprises a gas passage communicating with said second supply hole and a space over said cell.

4. The member of claim 1, comprising an additional sealing surface against a separator connecting a plurality of said cells.

5. An electrochemical system comprising a plurality of planar electrochemical cells each having a first main face and a second main face, a plurality of holding members for holding said cells, and a plurality of separators electrically connecting said cells with each other, each said holding member holding one of said cells, each said separator electrically connecting two of said cells, wherein each said cell is made of a ceramic material with a through hole formed therein, said separators and said cells are stacked alternately, each said holding member comprises an integrated body made of a ceramic material, each said holding member comprises a planar main body, a protruded portion protruding from said main body, a first supply hole formed in said holding member for supplying a first gas and a second supply hole formed in said holding member for supplying a second gas, each of said first supply hole and said second supply hole extends through said main body and through said protruded portion between a first surface of said holding member and a second surface of said holding member, said main body has a sealing surface against said first main face of an adjacent said cell, and each said protruded portion is positioned in said through hole of an adjacent cell.

6. The system of claim 5, wherein said main body comprises a gas passage communicating with said first supply hole and a space over said cell.

7. The system of claim 5, wherein said protruded portion comprises a gas passage communicating with said second supply hole and a space over said cell.

8. The system of claim 5, wherein said holding member comprises an additional sealing surface against said separator.

9. The system of claim 8, comprising a first sealing member between said sealing surface of said main body and said first main face of said cell, and a second sealing member between said additional sealing surface of said holding member and said separator.

10. The system of claim 5, wherein a pressure is applied on said first main face in a direction substantially perpendicular to said first main face.

11. The system of claim 5, comprising a gasket for sealing between said separator and said holding member.

12. The system of claim 5, wherein a supply passage communicating with said first supply hole and a space over said cell is formed in said separator.

13. The system of claim 12, wherein a gas passage communicating with said first supply hole and said space over said cell is not formed in said holding member.

14. The system of claim 5, wherein a supply passage communicating with said second supply hole and a space over said cell is formed in said separator.

15. The system of claim 14, wherein a gas passage communicating with said second supply hole and said space over said cell is not formed in said holding member.

16. The system of claim 9, wherein a first recess for receiving said first sealing member and a second recess for receiving said second sealing member are formed in said separator.

17. The system of claim 5, comprising a connecting member having an electrical conductivity between said separator and said cell, wherein said connecting member is permeable and deformable.

18. The system of claim 17, wherein said connecting member comprises an emboss shape provided portion.

19. The system of claim 17, wherein said connecting member is composed of a mesh.

20. A holding structure for holding a planar electrochemical cell made of a ceramic material with a through hole formed therein, wherein said structure comprises said cell and a holding member for holding said cell, said holding member comprises an integrated body made of a ceramic material and comprises a planar main body, a protruded portion protruding from said main body, a first supply hole formed in said holding member for supplying a first gas and a second supply hole formed in said holding member for supplying a second gas, each of said first supply hole and said second supply hole extends through said main body and through said protruded portion between a first surface of said holding member and a second surface of said holding member, and said main body has a sealing surface against a first main face of said cell while said protruded portion is inserted into said through hole.

21. The structure of claim 20, wherein said main body comprises a gas passage communicating with said first supply hole and a space over said cell.

22. The structure of claim 20, wherein said protruded portion comprises a gas passage communicating with said second supply hole and a space over said cell.

23. The structure of claim 20, wherein said holding member comprises an additional sealing surface against a separator connecting a plurality of said cells.

24. The structure of claim 20, comprising a sealing member between said sealing surface of said main body and said first main face of said cell.

* * * * *